US007816617B2

(12) United States Patent
Bennett et al.

(10) Patent No.: US 7,816,617 B2
(45) Date of Patent: Oct. 19, 2010

(54) CONFIGURABLE INTELLIGENT CONVEYOR SYSTEM AND METHOD

(75) Inventors: Brian Bennett, Dryden, NY (US); John Nasakaitis, Elmira, NY (US); Eric Eaton, Newark Valley, NY (US); Jean-Paul Laplante, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 543 days.

(21) Appl. No.: 11/751,427

(22) Filed: May 21, 2007

(65) Prior Publication Data

US 2008/0290005 A1 Nov. 27, 2008

(51) Int. Cl.
*B65G 47/10* (2006.01)

(52) U.S. Cl. .................. 209/584; 198/349; 198/370.01

(58) Field of Classification Search ................ 209/583, 209/584, 900, 648; 198/347.4, 370.01, 370.02, 198/370.03, 370.04, 370.05, 370.06, 370.07, 198/370.08, 370.09, 358, 349, 349.8
See application file for complete search history.

(56) References Cited

U.S. PATENT DOCUMENTS 3,929,218 A 12/1975 Risley
4,038,531 A 7/1977 Loe, Jr.
4,604,704 A 8/1986 Eaves et al.
5,253,564 A 10/1993 Rosenbrock et al.
6,240,335 B1 5/2001 Wehrung et al.
6,292,710 B1 9/2001 Bonnet
6,405,851 B1 6/2002 Takeda
6,453,210 B1 9/2002 Belotserkovskiy et al.
6,459,061 B1 * 10/2002 Kugle et al. ................ 209/583
6,578,702 B2 6/2003 Falkowski
6,609,607 B2 * 8/2003 Woltjer et al. .......... 198/457.03
6,899,217 B1 5/2005 Fortenbery et al.
6,953,906 B2 * 10/2005 Burns et al. ................. 209/584
7,414,218 B2 * 8/2008 Wheeler et al. ............. 209/584
2002/0010527 A1 1/2002 Wielebski et al.
2004/0005080 A1 1/2004 Hayduchok
2005/0049745 A1 3/2005 LeVasseur et al.
2006/0021858 A1 2/2006 Sherwood
2006/0111123 A1 5/2006 Nerat
2007/0090028 A1 * 4/2007 Varney ....................... 209/584

FOREIGN PATENT DOCUMENTS

EP 1445794 8/2004
JP 2004 189374 7/2004
WO 02099549 12/2002

* cited by examiner

*Primary Examiner*—Joseph C Rodriguez
(74) *Attorney, Agent, or Firm*—Leland Schultz, Esq.; Roberts Mlotkowski Safran & Cole, P.C.

(57) ABSTRACT

A method includes deducting selected ones of a plurality of products from a first sorting and/or sequencing system to a conveying system, and determining data including at least one of: a predicted position of each of the selected ones of the plurality of products within the conveying system, and speed and direction of conveyors of the conveying system. The method also includes controlling movement of the selected ones of the plurality of products through the conveying system by controlling speed and direction of the conveyors based upon the determined data, and inducting the selected ones of the plurality of products onto a second sorting and/or sequencing system.

37 Claims, 17 Drawing Sheets

BELT TRACKING

PACKAGE TRACKING

DYNAMIC ACCUMULATION/THROUGHPUT TRACKING

CONFIGURABLE INTELLIGENT CONVEYOR SYSTEM AND METHOD

BACKGROUND OF THE INVENTION

1. Field of the Invention

The present invention relates generally to systems and methods for conveying product, and more particularly to conveying product in sorting and/or sequencing operations.

2. Background Description

The delivery of mail pieces such as letters, catalogs, advertisements, parcels, bundles, packages, and a host of other product, has increased exponentially over the years. These mail pieces are known to be critical to commerce and the underlying economy. It is thus critical to commerce and the underlying economy to provide efficient delivery of such mail pieces in both a cost effective and time efficient manner. This includes, for example, sorting and/or sequencing mail pieces for delivery. By efficiently sorting and sequencing mail pieces, the delivery of mail and other product can be provided in an orderly and effective manner.

The sorting and sequencing of mail is a very complex, time consuming task. In general, the sorting and sequencing of mail is processed though many stages, including processes which sort or sequence the mail in delivery order sequence. These processes can either be manual or automated, depending on the sorting facility, the type of product to be sorted such as packages, flats and letters and the like. A host of other factors may also contribute to the automation of the sorting, from budgetary concerns to modernization initiatives to access to appropriate technologies to a host of other factors.

In general, however, most modern mail handling facilities have taken major steps toward automation by the implementation of a number of technologies. These technologies include, amongst others, letter sorters, parcel sorters, advanced tray conveyors, flat sorters and the like. As a result of these developments, postal facilities and other handling facilities have become quite automated over the years, considerably reducing overhead costs. Without these automated systems, it would be virtually impossible for the postal system such as the United States Postal Service (USPS) to efficiently deliver mail pieces in a time sensitive and cost efficient manner. But, further developments must still be made in order to ever increase throughput and capacity of these automated systems.

In known automated systems, the mail pieces are provided in random order to the postal service or other mail handling facility. At these mail facilities, the mail pieces are then sorted and/or sequenced in delivery point order by many different, complex processes and systems. In one type of automated system, for example, an Automated Package Processing System (APPS) is utilized such as those designed and manufactured by Lockheed Martin Corporation.

A sorting and/or sequencing system has input feeders that receive a random stream of mail pieces and gather information about each individual mail piece, such as, for example, the delivery destination. The input feeders utilize optical character recognition (OCR), bar code recognition (BCR), handwritten recognition, and/or image capture for determining delivery information (i.e., address, zip code, etc.) associated with each mail piece.

A controller receives the information associated with each mail piece from the input feeders, and tracks the position of each mail piece as it moves from the input feeders onto an endless conveyor. The controller, which comprises a predetermined sorting and sequencing scheme (e.g., a software algorithm), controls the endless conveyor and various cross-belt sorters to move the mail pieces into appropriate discharge chutes based upon the sorting and sequencing scheme using the information captured from the mail piece (e.g., delivery address). In this manner, mail pieces may be sorted and/or sequenced according to the sorting and sequencing scheme.

A sorting and/or sequencing system typically has two to four input feeders and about three hundred discharge chutes. However, use in industry has revealed a need for more discharge chutes, such as, for example, four hundred, six hundred, or more, discharge chutes. Moreover, experience has shown that simply increasing the amount of input feeders and discharge chutes in the sorting and/or sequencing system is not economically feasible due to a significant amount of re-design that would be required.

Accordingly, it has been proposed to link two conventional sorting and/or sequencing systems together by conveying mail pieces from at least one discharge chute of a first sorting and/or sequencing system to an input feeder of a second sorting and/or sequencing system. However, simply conveying mail pieces from a discharge chute of a first sorting and/or sequencing system to a second sorting and/or sequencing system introduces inefficiencies into the sorting system. For example, the information that was gathered at the input feeders of the first sorting and/or sequencing system is lost during conveyance between the first and second sorting and/or sequencing systems. Thus, each mail piece that is conveyed to the second sorting and/or sequencing system must be run through an input feeder of the second sorting and/or sequencing system so that the information of the product can be recaptured and processed for use in the second sorting and/or sequencing system. Also, there is no coordination between the two systems.

By using two systems in the above manner, the mail pieces are fed through a feeder twice, which increases damage to the mail pieces. Also, known optical recognition systems typically have a reliability of approximately 70%; however, by having to read the mail pieces twice, the rate is multiplied by itself, thereby dramatically reducing the read rate and thus requiring more manual operations. That is, the read rate is decreased and an operator may have to manually read the destination codes and manually sort the mail when the scanner is unable to accurately read the destination code, address or other information associated with the mail pieces two consecutive times. Additionally, bar code labeling and additional sorting steps involves additional processing time and sorting and/or sequencing system overhead as well as additional operator involvement. This all leads to added costs and processing times.

Accordingly, there is a need for more efficient linking of sorting and/or sequencing systems at facilities, such as, for example, warehouses, postal facilities, etc.

SUMMARY OF THE INVENTION

According to a first aspect of the invention, there is a system that comprises first and second input feeders structured and arranged to receive a random stream of a plurality of products, gather information from each product, and deposit each product on an endless conveyor. A first set of discharge chutes and a second set of discharge chutes are structured to receive respective products of the plurality of products from the endless conveyor. The system also includes a bypass lane structured to receive at least one product of the plurality of products from the endless conveyor at a first location, and deposit the at least one product of the plurality of products back onto the endless conveyor at a second location.

According to a second aspect of the invention, there is a system comprising a first sorting and/or sequencing system including an input feeder arranged to receive a random stream of a plurality of products, and a first endless conveyor arranged to receive the plurality of products from the input feeder and move the plurality of products toward discharge chutes. A conveying system is arranged to deduct a subset of products of the plurality of products from the first endless conveyor, and induct the subset of products onto a second endless conveyor of a second sorting and/or sequencing system. The system also includes a conveying controller arranged to: receive product information associated with each product of the subset of products from the first sorting and/or sequencing system; transmit the product information to the second sorting and/or sequencing system; determine position data of the subset of products within the conveying system; and control movement of the subset of products within the conveying system based upon the determined position data.

According to a third aspect of the invention, there is a computer program product comprising code embodied in a computer readable medium, which when operated on a computing device causes the computing device to control the movement of a plurality of conveyors in a conveying system. The computer program product comprises: a tracking component operable to determine a speed and direction of movement of each of the plurality of conveyors; a product tracking component operable to determine a predicted position of each of a plurality of products in the conveying system; and a control component operable to determine a desired speed and direction of movement of each of the plurality of conveyors.

According to a fourth aspect of the invention, there is a method that comprises deducting selected ones of a plurality of products from a first sorting and/or sequencing system to a conveying system. The method additionally includes determining data including at least one of: a predicted position of each of the selected ones of the plurality of products within the conveying system, and speed and direction of conveyors of the conveying system. The method further includes controlling movement of the selected ones of the plurality of products through the conveying system by controlling speed and direction of the conveyors based upon the determined data. The method also includes inducting the selected ones of the plurality of products onto a second sorting and/or sequencing system.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to a system, method, and computer implementation of a configurable and modular intelligent conveyor configured within a single sorting and/or sequencing system or spanning across two or more sorting and/or sequencing systems. Implementations of the invention provide an intelligent conveyor system that tracks product and other types of articles, objects, packages, mail pieces, etc. (hereinafter referred generally as "product"), and maintains the attributes of the product as they are conveyed within a single sorting and/or sequencing system or between two or more sorting and/or sequencing system. For example, embodiments of the invention provide an intelligent conveyor system that is operable to:

- receive product and associated product attributes from a first sorting and/or sequencing system;
- control and track the movement of the product from the first sorting and/or sequencing system to a second sorting and/or sequencing system; and
- deliver the product and associated product attributes to the second sorting and/or sequencing system.

In further implementations, the intelligent conveyor system is operable to provide the above functionality when transporting product between different portions of a single sorting and sequencing system.

Additionally, implementations of the invention provide for a changeable or modular configuration of such intelligent conveyor systems through object oriented programming. Also, although the invention is described with respect to product and mail processing facilities, it is understood that the invention may be used with other articles and other facilities such as, for example, fabrication facilities, warehousing, processing facilities, transportation, and end use (e.g., consumption) facilities, etc.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Intelligent Conveyor System

Figure 1:
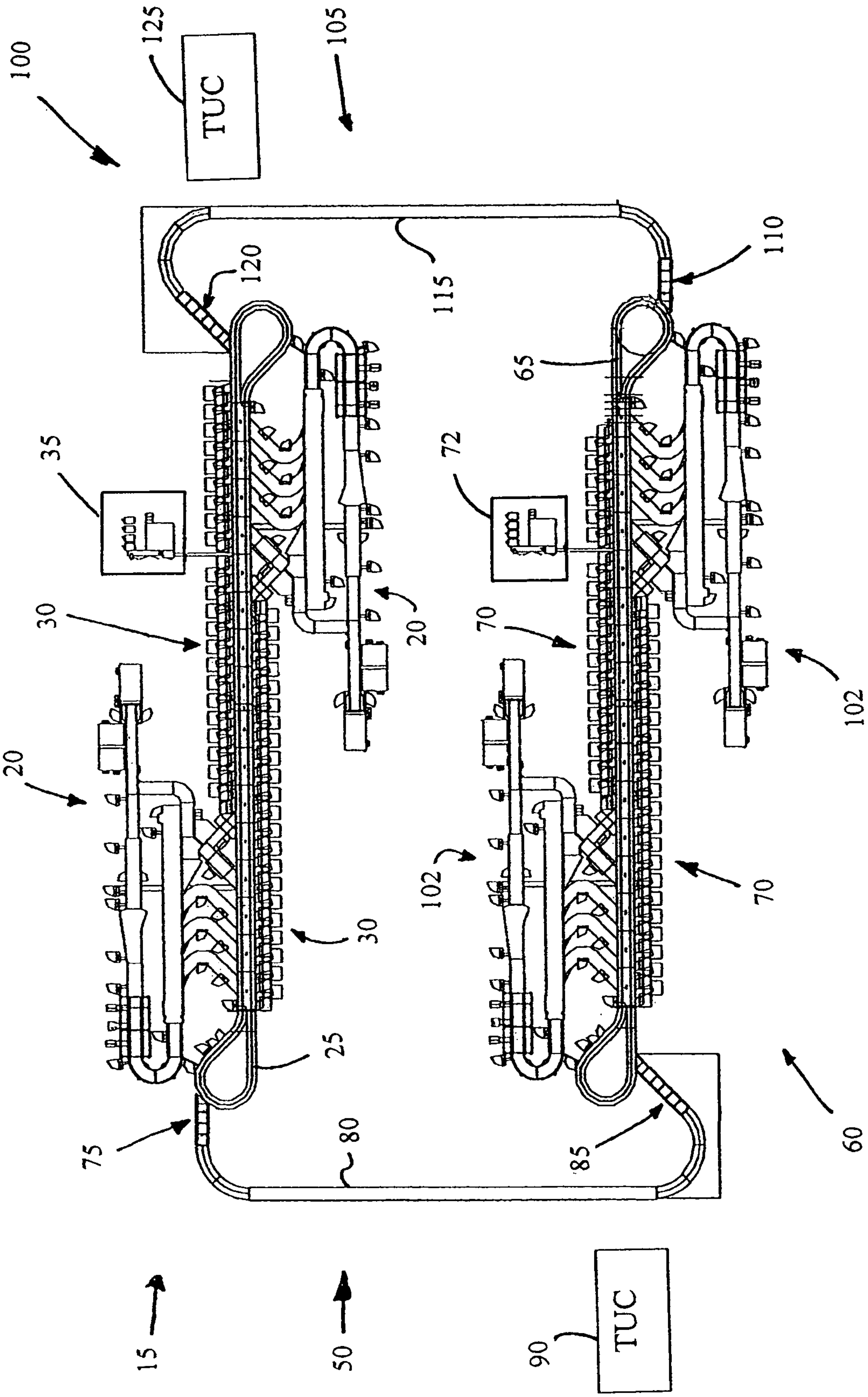
FIG. 1 shows a diagram of an intelligent conveyor system according to aspects of the invention.

FIG. 1 shows a generalized view of two sorting and/or sequencing systems connected by an intelligent conveyor system according to aspects of the invention. In embodiments, the sorting and/or sequencing systems can be any known conventional system such as, for example, an APPS machine designed and manufactured by Lockheed Martin Corporation. It should be understood, though, that any other type of sorting and/or sequencing system can be used within the scope of the invention.

In the illustrative example of FIG. 1, a first sorting and/or sequencing system 15 comprises two input feeders 20 that receive a stream of product to be sorted and/or sequenced through an endless conveyor 25. The input feeder collects information from each product, such as, for example, weight, dimensions, delivery address, etc., through the use of any known optical character recognition (OCR), bar code recognition (BCR), handwritten recognition, and/or image capture. The input feeders feed the product onto an empty cell (e.g., space) of endless conveyor 25.

Once the information of the product is captured it can be sent to controller 35, which controls the endless conveyor 25 and each cross-belt sorter to deposit the product into the appropriate discharge chutes 30 according to a sorting scheme using the information (e.g., delivery address) associated with each product. The controller 35 may comprise, for example, a computing device with appropriate hardware and/or software for performing the above-described operations using any known single or double pass sorting algorithm, for example. Such controllers and sorting algorithms are known in the art and, as such, do not require further description herein.

In accordance with the invention, the endless conveyor 25 moves each product around a closed circuit past discharge chutes 30. At each discharge chute 30, there is a cross-belt sorter that is structured and arranged to selectively move a product off the endless conveyor 25 into the appropriate discharge chute 30 by control of the controller 35.

As further seen in FIG. 1, the system of the invention includes an intelligent conveyor system 50 connecting the first sorting and/or sequencing system 15 to a second sorting and/or sequencing system 60. Similar to the first sorting and/or sequencing system 15, the second sorting and/or sequencing system 60 has two feeding units 102, an endless conveyor 65, a multitude of discharge chutes 70, and a controller 72.

In embodiments, the intelligent conveyor system 50 comprises a deduction section 75, a transfer section 80, an induction section 85, and a transfer unit controller 90. The deduction section 75 takes the place of one of the discharge chutes 30 of the first sorting and/or sequencing system machine 15, such that product that would be moved into that discharge chute are instead moved onto the deduction section 75. The deduction section 75 comprises at least one conveying system such as, for example, a conveyor belt, that travels at substantially the same speed as the cross-belt sorter that moves a product off of the endless conveyor 15. By maintaining a same or substantially the same speed, damage to product moved onto the deduction section 75 can be minimized. In embodiments, the deduction section comprises a conveyor belt that is arranged at an angle of about 45° relative to the endless conveyor 25, although other configurations are also contemplated by the invention.

The transfer section 80 comprises at least one conveying system such as, for example, a conveyor belt, that moves product between the deduction section 75 and the induction section 85. In embodiments, the transfer section 80 may comprise any number of conveyor belts arranged in a serial fashion between the deduction section 75 and the induction section 85. The conveyor belts may be arranged in any suitable configuration, including, for example, straight, curved, angled, etc. As described in greater detail below, the speed of each individual conveyor belt (or conveying system, in general) of the transfer section 80 is controlled by the transfer unit controller 90 according to various system parameters.

The induction section 85 receives product from the transfer section 80 and delivers the product to the second endless conveyor 65 of the second sorting and/or sequencing system 60. The induction section 85 comprises at least one conveying system such as, for example, a conveyor belt, that travels at substantially the same speed as the second endless conveyor 65, thereby minimizing damage to product moved onto the second endless conveyor 65 of the second sorting and/or sequencing system 60. In embodiments, the induction section comprises a conveyor belt (or conveying system, in general) that is arranged at an angle of about 45° relative to the second endless conveyor 65, although other configurations are also contemplated by the invention.

The deduction section 75, transfer section 80, and induction section 85 may be comprised of any suitable series of conveyor belts or other conveying mechanisms (driven rollers and the like), having any appropriate shape, length, etc. to connect two or more systems. Alternatively, the deduction section 75, transfer section 80, and induction section 85 may be used in a single system, where the deduction section 75 and induction section 85 are preferably driven at a same speed as the endless belt of the single system.

As used hereinafter, the term "transfer lane" refers to a series of conveyor belts (or other conveying mechanisms) making up the deduction section 75, transfer section 80, and induction section 85. Also, throughout this disclosure, the sorting and/or sequencing system which moves product onto the transfer lane is described as "upstream", while the sorting and/or sequencing system that receives product from the transfer lane is termed "downstream".

In embodiments, the transfer unit controller 90 comprises a computing device (for example, similar to the controller 35) comprising any appropriate combination of hardware and/or software for performing the operations described herein. In embodiments, the transfer unit controller 90 receives product information (e.g., weight, dimensions, address, etc.) from the controller 35 for each product as the product is moved onto the deduction section 75 of the transfer lane. As described in greater detail below, the transfer unit controller 90 tracks the position of, and controls the movement of, each product as it moves through the transfer lane. As the product is moved from the induction section 85 to the second endless conveyor 65, the transfer unit controller 90 passes the product information to the second sorter controller 72. In this manner, the second sorting and/or sequencing system 60 is provided with the attributes (e.g., weight, dimensions, address, etc.) of each product, without having to pass each product through an input feeder of the sorting and/or sequencing system 60. This allows a sorting facility to operate a sorting scheme for roughly twice (or more) as many discharge chutes as would normally be, available with a single sorting and/or sequencing system, while only having to pass each product through an input feeder once, thereby increasing the efficiency of the sorting process.

Still referring to FIG. 1, in embodiments, a second intelligent conveyor system 100 may extend from the second sorting and/or sequencing system 60 to the first sorting and/or sequencing system 15. The second intelligent conveyor system comprises a transfer lane 105 comprising a deduction section 110 for deducting product from the second sorting and/or sequencing system 60, a transfer section 115, an induction section 120 for inducting product to the first sorting and/or sequencing system 15, and a transfer unit controller 125. These components may be similar to those described with respect to the first intelligent conveyor system 50, with note that the second intelligent conveyor system 100 is configured to transfer product from the second sorting and/or sequencing system 60 (in this case, the upstream system) to the first sorting and/or sequencing system 15 (in this case, the downstream system).

In such a closed-loop implementation, a product that enters the system through the first input feeder 20 and can be inducted into any discharge chute on any sorting and/or sequencing system in the loop. For example, product that is initially inducted onto the first sorting and/or sequencing system 15 can be discharged to a discharge chute 30 of the first sorting and/or sequencing system 15 via the first endless conveyor 25. Similarly, a product that enters the system through the second input feeder 102 can be inducted into a discharge chute 70 of the second sorting and/or sequencing system 60 via the second endless conveyor 65. Moreover, a product that enters the system through the first input feeder 20 can be routed to discharge chute 70 of the second sorting and/or sequencing system 60 by way of the transfer lane 50 and the second endless conveyor 65. Likewise, a product that enters the system through the second input feeder 102 can be routed to discharge chute 30 of the first sorting and/or sequencing system 15 by way of the transfer lane 102 and first endless conveyor 25. In this way, the closed-loop implementation provides the capability of increased throughput of the sorting and sequencing of product by sharing the resources (e.g., feeders, discharge cutes, etc.) more efficiently of the first and second sorting and/or sequencing systems.

Figure 2:
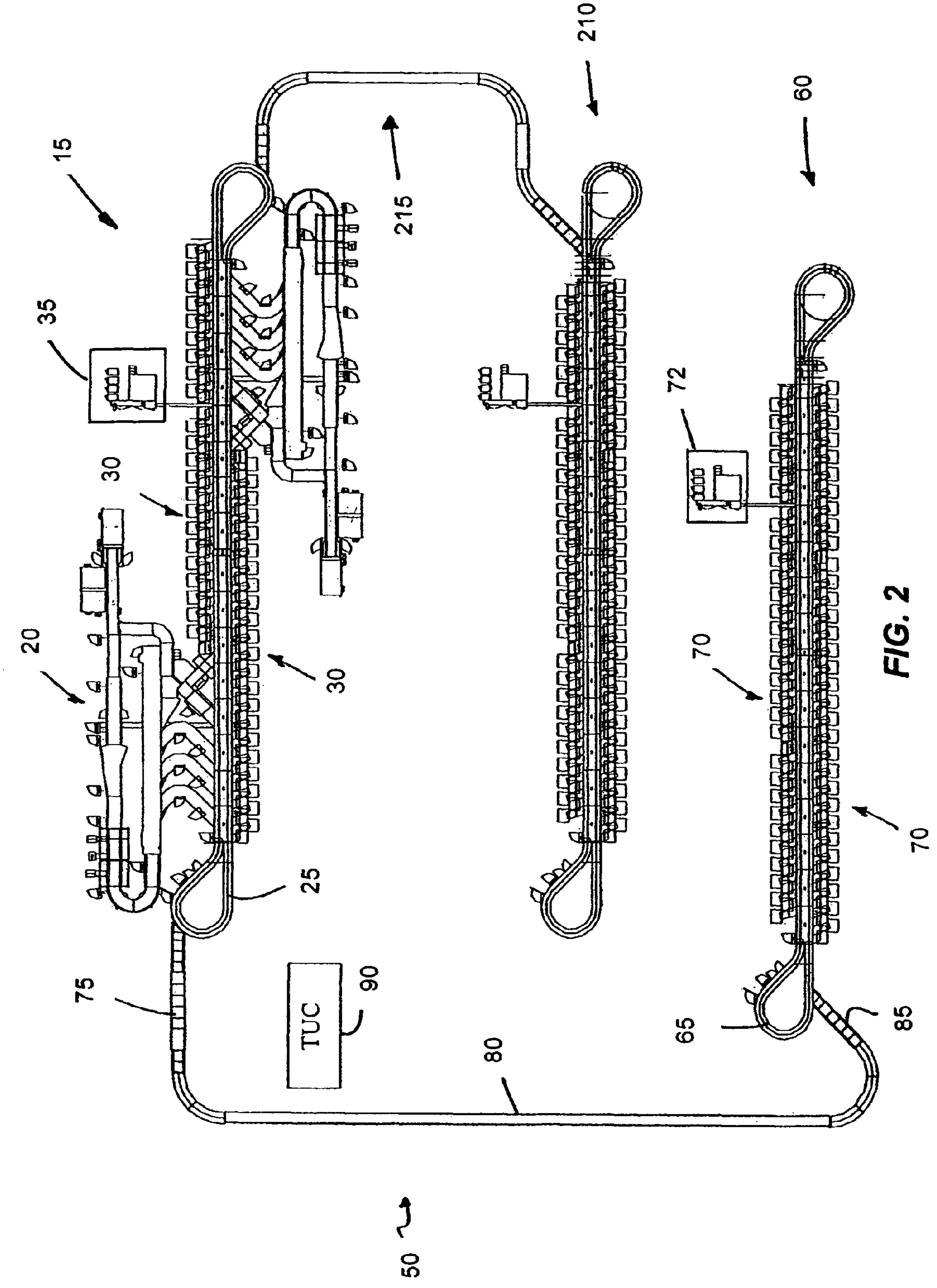
FIG. 2 shows a further embodiment of an intelligent conveyor system according to aspects of the invention.

While only two sorting and/or sequencing systems are shown connected in FIG. 1, any appropriate number of sorting and/or sequencing systems may be connected by any desired number of transfer lanes, in any suitable open-loop and/or closed-loop configuration. For example, as shown in FIG. 2, two sorting and/or sequencing systems are disposed downstream of a single upstream sorting and/or sequencing system in an open-loop configuration. That is, a first sorting and/or sequencing system 15 is connected to a second sorting and/or sequencing system 60 by a first intelligent conveyor system 50, as described above with respect to FIG. 1. Also, a third sorting and/or sequencing system 210 is connected to the first sorting and/or sequencing system 15 by a second intelligent conveyor system 215. The transfer of product from the first sorting and/or sequencing system 15 to the third sorting and/or sequencing system 210 may be accomplished as described above with respect to FIG. 1. In this manner, a sorting scheme using the output bins of all three sorting and/or sequencing system may be used in accordance with the invention. Similarly, three, four, or any appropriate number of downstream sorting and/or sequencing systems, and associated intelligent conveyor systems, may be used within the scope of the invention.

Figure 3:
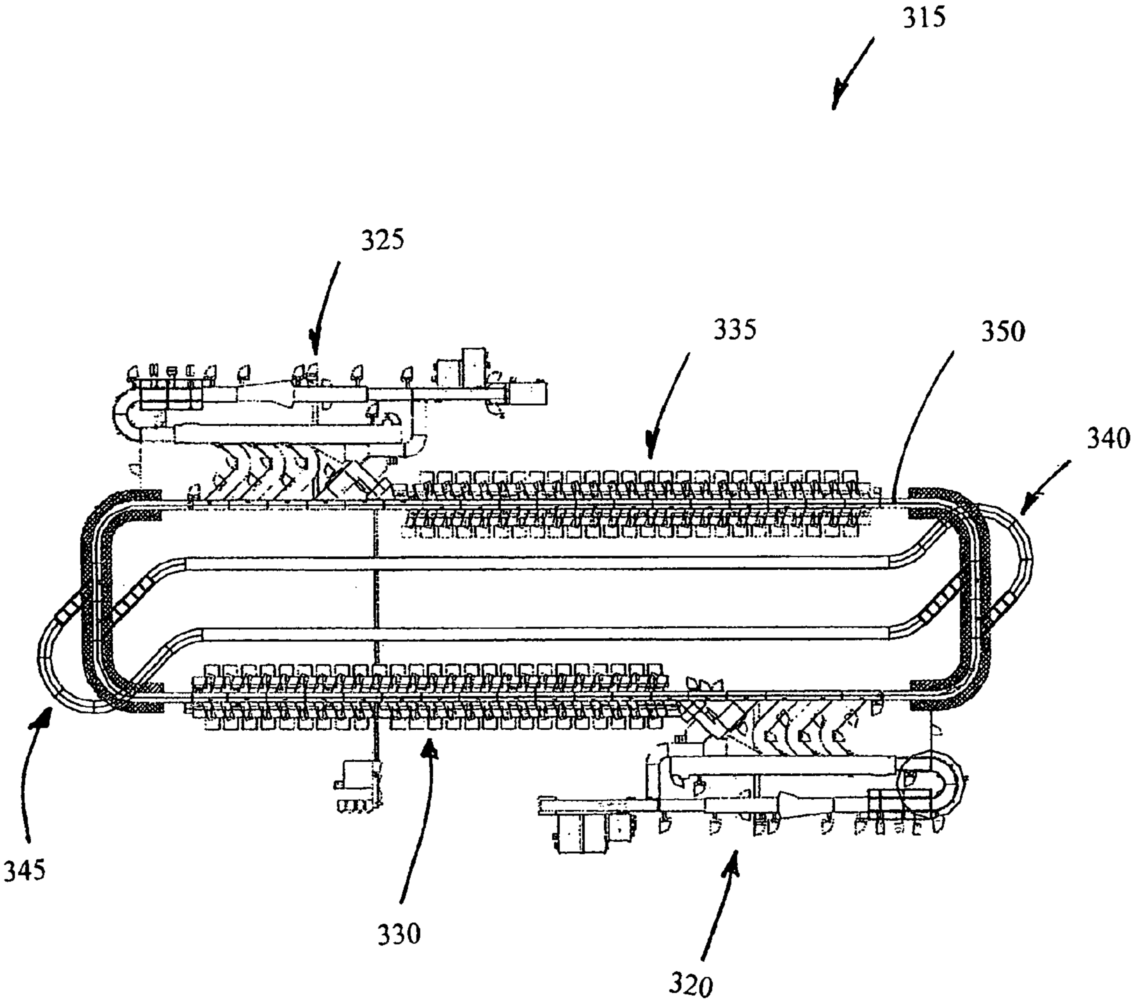
FIG. 3 shows a further embodiment of an intelligent conveyor system according to aspects of the invention.

In an alternative embodiment depicted in FIG. 3, a single sorting and/or sequencing system 315 may comprise two input feeders 320, 325, two sets of discharge chutes 330, 335, and two bypass lanes 340, 345 arranged to enhance the efficiency of moving product between the discharge chutes 330, 335. For example, a first input feeder 320 and a first set of discharge chutes 330 may be provided on a first side of the endless conveyor 350 and a second input feeder 325 and a second set of discharge chutes 335 may be provided on a second side of the endless conveyor 350.

In this implementation, a first bypass lane 340, which is similar in operation and construction to the transfer lane described above with respect to FIG. 1, may be arranged to receive product from the endless conveyor 350 immediately downstream of the first input feeder 320, and to deposit the product onto the endless conveyor 350 immediately upstream of the first set of discharge chutes 330. When a product is inducted through the first input feeder 320 and is destined for one of the first set of discharge chutes 330, the first bypass lane 340 prevents the product from unnecessarily passing by the second set of discharge chutes 335. A second bypass lane 345 may be arranged in a similar manner to bypass the first set of discharge cutes 330. In this manner, vacant cells may be created on the endless conveyor 350, which can lead to increased sorting efficiency.

In implementations, such as, for example, the embodiments shown in FIGS. 1-3, the transfer unit controller 90 is configured to communicate with each controller of each sorting and/or sequencing system. This allows the transfer unit controller 90 to receive product information from the upstream sorting and/or sequencing system and hand off this information to the downstream sorting and/or sequencing system. In this way, the product information captured from one sorting and/or sequencing system can be seamlessly shared with another sorting and/or sequencing system as the product is transferred between systems. As such, in implementation, the product does not have to be fed through the input feeders of the downstream sorting and/or sequencing system, saving considerable time and decreasing the possibility of damage to the product. This also allows seamless coordination of the activities of each sorting and/or sequencing system.

In operation, the transfer unit controller 90 tracks the position of each product as the product enters and passes through the transfer lane. As an illustrative example, once the product is transferred onto the transfer lane and the information is provided to the transfer unit controller 90, position tracking of the product may be performed using a combination of sensors and software programming. For example, rotary shaft encoders may be provided on the drive motor of each conveyor belt in each of the transfer lanes. Signals from the rotary shaft encoders that indicate how far each conveyor belt has traveled are provided to the transfer unit controller 90 in a known manner. Moreover, the operational length of each conveyor belt and the calibration of each rotary shaft encoder are provided to the transfer unit controller 90 via a configuration file (described in greater detail below). Additionally, the time that a particular product was placed onto the deduction section 75 is known from communication with the first controller 35. With this information, and via the use of appropriate computational operations as discussed herein, the transfer unit controller 90 may determine a predicted position for each product in the transfer lane.

In embodiments, photoeye sensors may be mounted at various locations along the transfer lane to detect the passage of product at known locations. The transfer unit controller 90 may use the signals from the photoeye sensors to verify the predicted position of each product. This verification may be used as a fault detection (e.g., to signal that a product possibly has fallen off a conveyor belt) and/or to update the actual position of each product (perhaps due to a slight shift on the conveyor belt) for use in future determinations of predicted position.

Although rotary shaft encoders and photoeye sensors are described above, it is noted that any appropriate sensor(s) may be used within the scope of the invention. For example, Hall-effect sensors and/or optical detectors may be used instead of, or in addition to, rotary shaft encoders. Such sensors may be applicable when the transfer lane includes driven rollers, instead of a belt configuration. Likewise, barcode readers and/or RFID sensors may be used instead of, or in addition to, photoeye sensors.

In a manner similar to tracking the position of each product along the transfer lane, the transfer unit controller 90 may also track the position of empty spaces on any and/or all portions of the transfer lane. The combination of product positions and empty space positions along the conveyor belts, for example, may be used for optimizing the control of each conveying drive motor.

For example, the transfer unit controller 90 may be operatively connected to each drive motor of each conveyor belt in the transfer lane. In embodiments, each conveyor belt is driven by a variable frequency drive motor with forward and reverse drive capability. Such drive motors are known in the art, such that they do not require further description herein. By sending appropriate signals to these drive motors, the transfer unit controller 90 may control the movement of each conveyor belt (or other conveying systems) independently and simultaneously to achieve a desired movement of all of the product in the transfer lane.

In embodiments, the transfer unit controller 90 controls the movement of each conveyor belt (or other conveying systems) in the transfer lane based upon system constraints, determined product positions, and determined empty space positions. System constraints may include, for example:

(i) the need to receive product from the upstream sorting and/or sequencing system whenever the upstream sorting and/or sequencing system directs a product toward the intelligent conveyor;

(ii) the need for at least the first conveyor belt of the deduction section to move at substantially the same speed as the cross-belt sorter of the upstream sorting and/or sequencing system;

(iii) the limitation that only a single product may occupy a single cell on any conveyor belt in the transfer lane;

(iv) the need to deposit a product onto an empty cell of the downstream sorting and/or sequencing system endless conveyor; and (v) the need for at least the last conveyor belt of the deduction section to move at substantially the same speed as the endless conveyor of the downstream sorting and/or sequencing system.

In implementations of the invention, the transfer unit controller 90 includes at least one software component (described in greater detail below). Based upon the system constraints, the current position of every product, and the current position of every empty space, the transfer unit controller uses the software component to determine a control signal for each drive motor in the series of conveyor belts (or other conveying systems) in the intelligent conveyor system. The transfer unit controller 90, via such processes as described herein, coordinates product deduction from the upstream sorting and/or sequencing system, spacing of product along portions of the transfer lane, and product induction onto the downstream sorting and/or sequencing system. The processes may be arranged to provide a desired balance between buffering (e.g., slowing the movement of product to avoid a collision (i.e., two products requiring the same cell at the same time)) and throughput (e.g., moving the product through the intelligent conveyor system as fast as possible).

Method of Use

Figure 4:
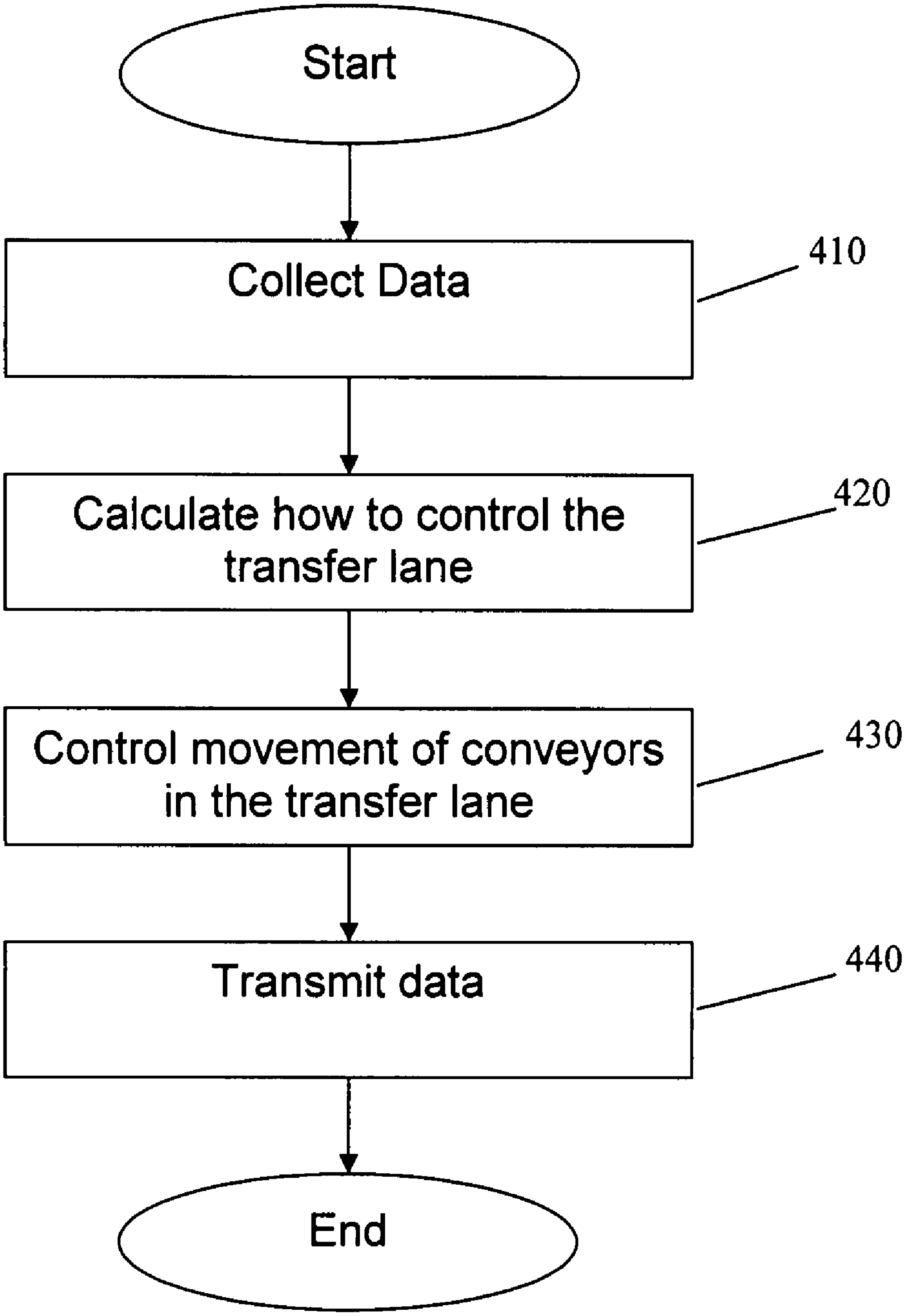
FIGS. 4 through 12 show flow diagrams depicting process steps according to aspects of the invention.

FIG. 4 is a flow diagram showing steps implemented according to aspects of the invention. The steps of embodiments of the invention, as depicted in FIG. 4, and other flow diagrams, may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation or the sort computer over the Internet or some other type of network. FIG. 4, and the other flow diagrams, may equally represent a high-level block diagram of the system of the present invention, implementing the steps thereof.

In embodiments, the steps depicted in FIG. 4 may be implemented with an intelligent conveyor system comprising a transfer lane and transfer unit controller. The transfer lane may comprise a series of conveying systems, e.g., conveyor belts, arranged in any suitable configuration, and the transfer unit controller may comprise any suitable computing device. For example, the transfer lane and transfer unit controller may be similar to those described above with respect to FIGS. 1-3.

At step 410, data is collected by the transfer unit controller for each product. In embodiments, this data collection comprises a predicted position for each product in the transfer lane. The data collection may further comprise the location of empty cells (e.g., available space on conveyor belts) on the transfer lane. The predicted position and empty cells may be determined by the transfer unit controller as described above (e.g., using sensors, software, etc.).

Furthermore, the data collection performed at step 410 may comprise the transfer unit controller receiving product information from a controller of an upstream sorting and/or sequencing system. For example, the controller of the upstream sorting and/or sequencing system may transmit information to the transfer unit controller that a product will be deducted from the upstream sorting and/or sequencing system to the transfer lane at a specific time and/or the product has been already been deducted to the transfer lane. The message that a product has been deducted may include product attributes (e.g., weight, dimensions, delivery address) regarding the product. This transmission of information may be performed between the transfer unit controller and a controller of the upstream sorting and/or sequencing system, and may be performed in any suitable manner, such as, for example, via I/O bus, network connection, etc.

Even further, the data collection performed at step 410 may comprise the transfer unit controller receiving availability information from a downstream sorting and/or sequencing system. That is, in embodiments, the downstream sorting and/or sequencing system signals the transfer unit controller which cells of the endless conveyor of the downstream sorting and/or sequencing system are available for inducting a product from the transfer lane. This transmission of information may be performed between the transfer unit controller and a controller of the downstream sorting and/or sequencing system, and may be performed in any suitable manner, such as, for example, via I/O bus, network connection, etc.

At step 420, the transfer unit controller makes a determination (e.g., calculation) of how to control each conveyor belt (or other conveying systems) in the transfer lane. In embodiments, this calculation is made by the transfer unit controller, and is based upon the data collected in step 410. This calculation may further be made based upon any system constraints (such as, for example, those described above).

For example, from the data collected in step 410, the transfer unit controller knows:

a predicted position for each product in the transfer lane, all of the empty spaces in the transfer lane, when the next product will be arriving from the upstream sorting and/or sequencing system, and the availability of the downstream sorting and/or sequencing system.

Based upon this data and the system constraints, the transfer unit controller determines, via the use of an appropriate software algorithm (described in greater detail below), how to control each conveyor belt (or other conveying systems) of the transfer lane. That is, the transfer unit controller may calculate an operating speed for each and every belt in the transfer lane for the induction timing onto an endless belt of the appropriate sorting and/or sequencing system.

In one example, using the above information, the transfer unit controller may determine that the first conveyor belt of the deduction section needs to be moved at a suitable speed to receive a product from the upstream sorting and/or sequencing system. Similarly, the transfer unit controller may determine that the last conveyor belt of the induction section needs to be moved at a suitable speed to move a product to the downstream sorting and/or sequencing system. In this manner, the transfer unit controller, knowing the different system parameters discussed herein, can coordinate the movement of the product from the upstream sorting and/or sequencing system to the downstream sorting and/or sequencing system.

Other than matching speeds of the upstream and downstream sorting and/or sequencing systems, as described above, all of the conveying systems in the transfer lane may be controlled to optimize the movement of the product through the transfer lane. For example, the transfer unit controller may determine, for each belt (or other conveying systems) in the transfer lane, whether that belt should be operating in a buffering mode or a throughput mode. That is, the transfer unit controller may determine to operate a particular conveying system in buffering mode because there is no, or not enough, available space for receiving product on the downstream portion of the transfer lane or the downstream sorting and/or sequencing system. In such a case, the transfer unit controller may determine to move the conveying system slowly forward, not move the conveying system at all, or even move it in reverse. The transfer unit controller may determine to drive the conveying system at any speed provided by the resolution of the drive motors.

Alternatively, the transfer unit controller may determine to operate a particular portion of the transfer lane in throughput mode because there sufficient available space for receiving product on downstream portions of the transfer lane and/or the downstream sorting and/or sequencing system. In such a case, the transfer unit controller may determine to move the conveying system of the transfer lane slowly forward, quickly forward, etc. The determination of operating a particular portion of the transfer system in either buffering or throughput mode is made using a programmed process, discussed in greater detail below.

Thus, as described above, at step 420, the transfer unit controller calculates (e.g., determines) how to control each portion of the transfer lane thereby providing a coordination between the upstream and downstream sorting and/or sequencing systems. Then, at step 430, the transfer unit controller actually controls the movement of the portions of the transfer lane. To do so, in embodiments, the transfer unit controller transmits drive signals to the drive motor of each portion of the transfer lane, e.g., conveyor belt. As should now be understood, the drive signals are based upon the determinations made in step 420. In this manner, the transfer unit controller effectuates movement of the product through the transfer lane.

Optionally, at step 440, the transfer unit controller transmits data to the downstream sorting and/or sequencing system. In embodiments, when the transfer unit controller controls the last conveyor belt of the induction section to move a product onto the downstream sorting and/or sequencing system (or alternatively to another area of the same sorting and/or sequencing system), the transfer unit controller will pass a message to the controller of the downstream sorting and/or sequencing system. For example, the message may include an indication that a product was inducted at a specific time, and the attributes associated with that product. In this manner, the downstream sorting and/or sequencing system can identify where the product is on its endless conveyor, and knows the attributes of the product. Also, the downstream sorting and/or sequencing system can direct the product to an appropriate discharge chute without having to send the product through an input feeder for a second time.

This transmission of information may be performed between the transfer unit controller and a controller of the downstream sorting and/or sequencing system, and may be performed in any suitable manner, such as, for example, via I/O bus, network connection, etc. Additionally, step 440 need only be performed when a product is moved from the transfer lane to the downstream sorting and/or sequencing system.

The position of each product in the transfer lane may, and likely will, change after movement of the conveyor belts (or other conveying systems) in step 430. Accordingly, in embodiments, upon completion of step 430 (or after step 440), the method returns to step 410 to collect new data and begin the cycle again. The steps 410, 420, and 430 may be repeated at any suitable time interval, such as, for example, once every ten milliseconds, although other time intervals may be used with the invention.

FIGS. 5-12 are a flow diagrams showing processes that may be implemented according to aspects of the invention. Like FIG. 4, the steps depicted in FIGS. 5-12 may be implemented with an intelligent conveyor system comprising a transfer lane and transfer unit controller. The transfer lane may comprise a series of conveyor belts arranged in any suitable configuration, and the transfer unit controller may comprise any suitable computing device. For example, the transfer lane and transfer unit controller may be similar to those described above with respect to FIGS. 1-3.

Figure 5:
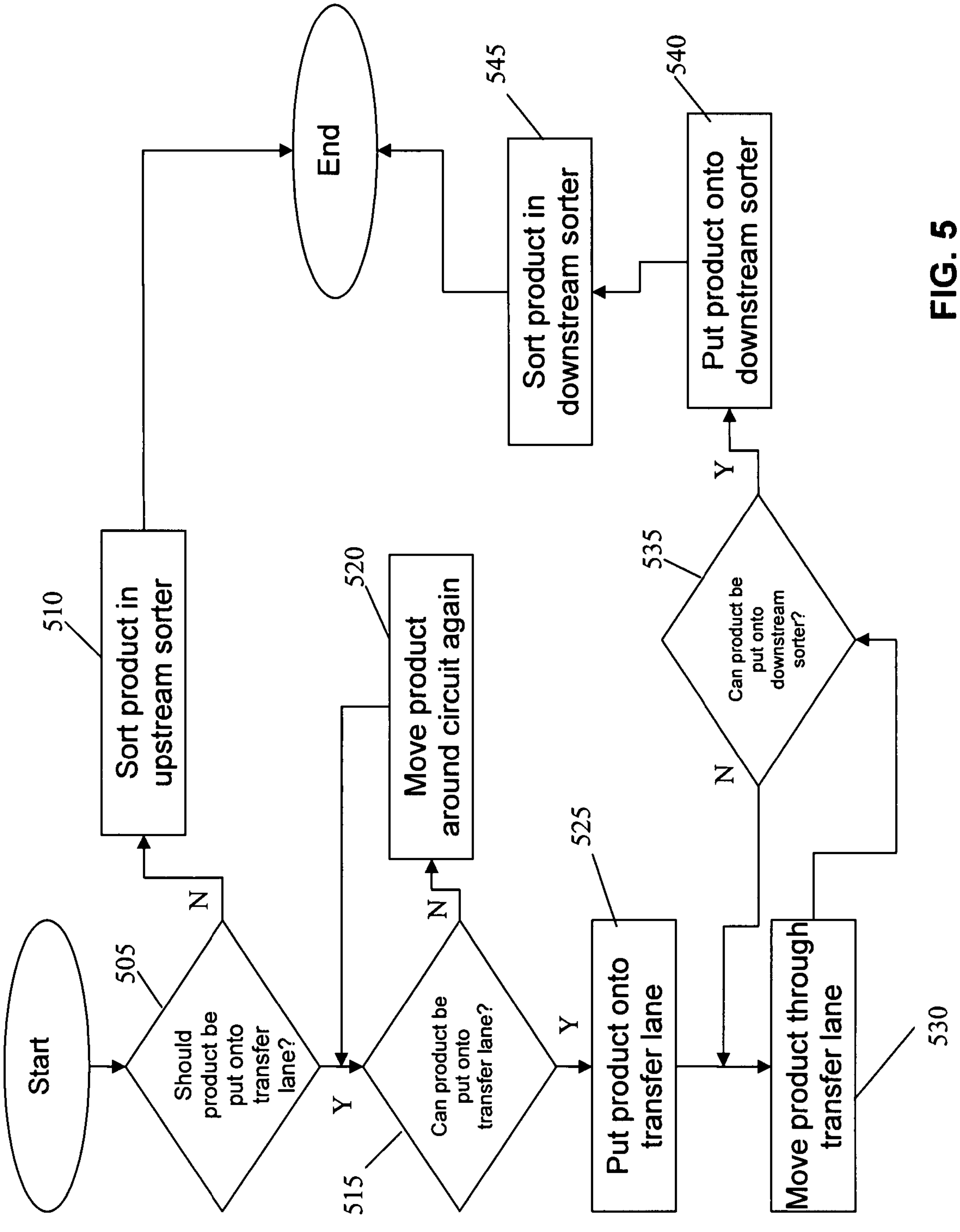

Referring now to the process shown in FIG. 5, at step 505 an upstream sorting and/or sequencing system determines whether it should deduct a product into a transfer lane. This determination is made, for example, according to a sorting scheme running on a controller of an upstream sorting and/or sequencing system, as described above with respect to FIG. 1. If the controller determines that the sorting scheme requires the product be discharged into a discharge chute of the sorting and/or sequencing system, then the determination at step 505 is negative, and the process proceeds to step 510. At step 510, the product is sorted into the appropriate discharge chute of the upstream sorting and/or sequencing system.

If, however, the controller determines that the product should be deducted from the upstream sorting and/or sequencing system to the transfer lane, then the process proceeds to step 515. At step 515, a determination is made as to whether the product can be deducted from the upstream sorting and/or sequencing system to the transfer lane. This determination may be made, for example, by the controller communicating with a transfer unit controller of the transfer lane. That is, the transfer unit controller may inform the controller that a cell is available at the beginning of the deduction section to receive the product.

Alternatively, the controller of the upstream sorting and/or sequencing system may receive a signal from a sensor that is located at the induction area of the deduction section of the transfer lane. For example, a photoeye sensor may be disposed at the induction area of the deduction section, which provides a signal to the controller that a product already occupies the space at the beginning of the deduction section. By providing the controller with the signal from this photoeye, the controller can then make a determination as to whether it is possible to deducted the product from the upstream sorting and/or sequencing system to the transfer lane.

At step 515, if it is determined that the product cannot be deducted from the upstream sorting and/or sequencing system to the transfer lane, the product will remain on the endless conveyor of the first sorting and/or sequencing system, such that it travels around the circuit again at step 520. If, however, it is determined that the product can be deducted from the upstream sorting and/or sequencing system to the transfer lane, then the product will moved onto the transfer lane at step 525. The deduction from the upstream sorting and/or sequencing system to the transfer lane may be performed, for example, by operating a cross-belt sorter to move the product from the endless conveyor of the upstream sorting and/or sequencing system onto a conveyor of the deduction section of the transfer lane.

In embodiments, the deduction from the upstream sorting and/or sequencing system to the transfer lane also comprises the controller communicating attributes of the product (e.g., size, weight, delivery address) to the transfer unit controller of the transfer lane. This communicating may be provided as described above, such as, for example, by network connection between the sorter controller and the transfer unit controller.

At step 530, the product is moved through the transfer lane. In embodiments, this movement may be performed as described above with respect to FIGS. 1-3 and/or steps 410, 420, and 430. For example, the transfer unit controller may collect data associated with the transfer lane, such as:

- predicted position of each product within the transfer lane,
- actual position of objects in the transfer lane according to sensors, and
- speed and direction of movement of each belt within the transfer lane, etc.

Based upon the collected data and known system constraints (such as those described above), the transfer unit controller may determine a desired speed and direction of movement of each conveying system in the transfer lane. Moreover, the transfer unit controller may send these signals to the respective drive motors of the conveying system of the transfer lane to effectuate such movement.

At step 535, a determination is made as to whether the product can be inducted onto the downstream sorting and/or sequencing system. This determination may be made, for example, by the transfer unit controller communicating with a sorter controller of the downstream sorting and/or sequencing system to receive an indication of an open cell on the endless conveyor of the downstream sorting and/or sequencing system. Additionally or alternatively, the transfer unit controller may receive a signal from a sensor (e.g., a photoeye) located along the endless conveyor of the downstream sorting and/or sequencing system, which provides the necessary information to the transfer unit controller of where an available cell exists on the endless conveyor.

At step 535, if it is determined that the product cannot be inducted onto the downstream sorting and/or sequencing system, then the process returns to controlling the movement of the product in the transfer lane at step 530. If, however, it is determined that the product can be inducted onto the downstream sorting and/or sequencing system, then at step 540 the product is physically moved from the transfer lane to the endless conveyor of the downstream sorting and/or sequencing system. This may be performed, for example, by the transfer unit controller providing a signal to the last conveying system in the transfer lane to move at a suitable speed for moving the product onto the endless conveyor of the downstream sorting and/or sequencing system.

In embodiments, step 540 includes passing the product attributes from the transfer unit controller to the controller of the downstream sorting and/or sequencing system. In this manner, it is not necessary to pass the product through an input feeder for a second time. The product is then sorted on the downstream sorting and/or sequencing system at step 545. This may be performed similar to step 510, wherein the product is sorted into a discharge chute of the downstream sorting and/or sequencing system. It should further be understood by those of ordinary skill in the art that the above processes can be used with a single sorting and/or sequencing system.

Figure 6:
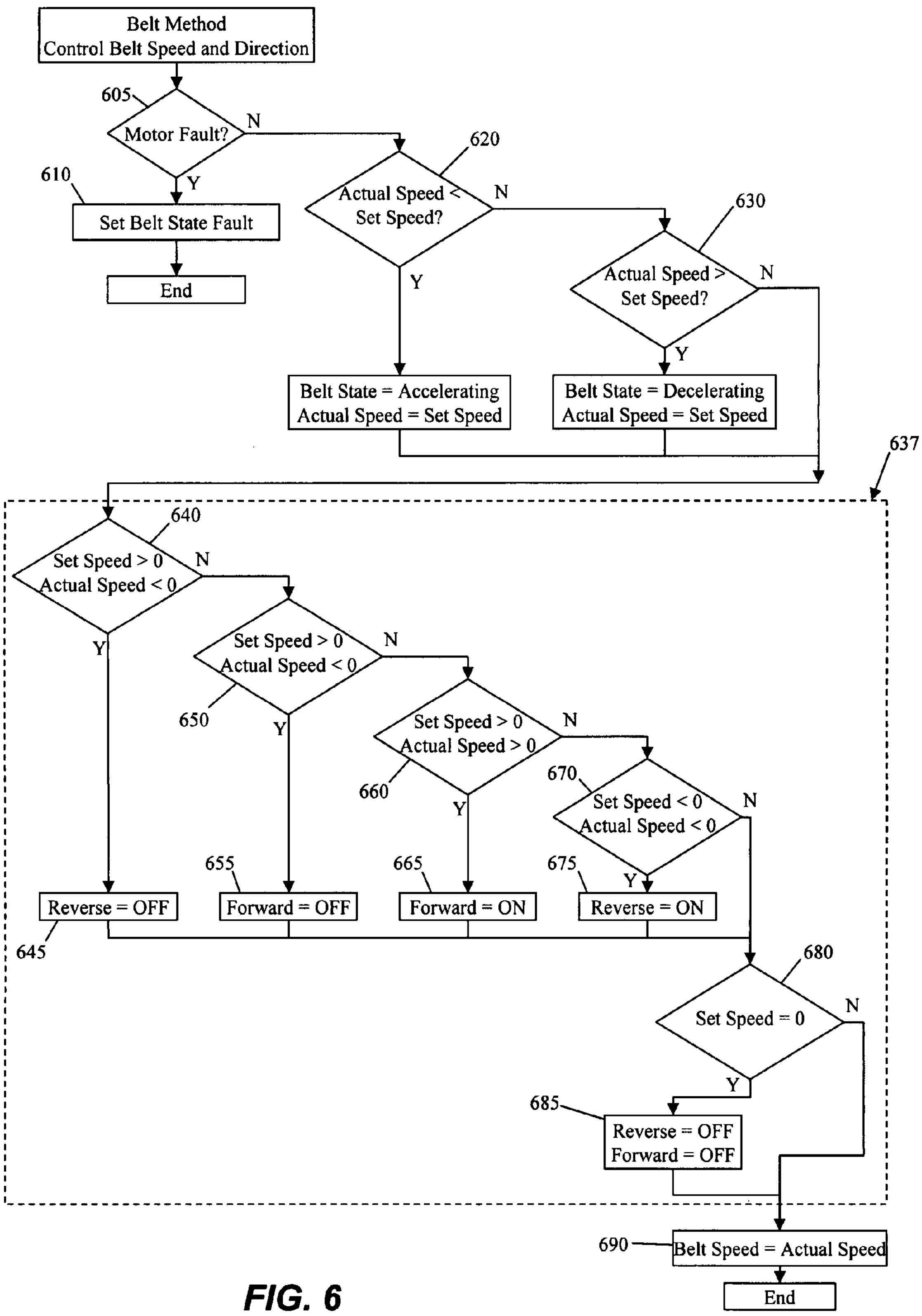

FIG. 6 shows a process for controlling the speed and direction of a conveying system (also referred to herein as a belt) according to aspects of the invention. The flow diagram of FIG. 6 represents an exemplary control routine that may be performed by the transfer unit controller to generate an appropriate control signal for drive motor of a belt in the transfer lane. In embodiments, the control routine is performed once every ten milliseconds, although other frequencies may be used as dictated by the desired operation of the transfer lane. Moreover, although FIG. 6 is described with respect to a single conveyor belt, it is understood that the transfer unit controller may run the control routine substantially simultaneously for each and every belt in the transfer lane.

At step 605, it is determined whether the drive motor of the particular belt has a motor fault. If the motor does have a fault, then at step 610 the belt state is set to fault, and the process ends at 615 because the speed and direction cannot be changed due to the motor fault. A motor fault may be determined by the transfer unit controller receiving appropriate signals from the drive motor.

If there is not a motor fault at step 605, then the process proceeds to step 620, where it is determined if the actual belt speed is less than the set belt speed. The actual belt speed may be determined by the transfer unit controller receiving appropriate signals from the encoder, as described above. The set belt speed is analogous to the desired (e.g., target) belt speed determined by the transfer unit controller, such as, for example, as described above in step 420. If the actual speed is less than the set speed, then at step 625 the belt state is set to accelerating. If the actual speed is greater than the set speed at step 630, then at step 635 the belt state is set to decelerating.

The steps contained within area 637 are used to determine the directional control of the belt. In embodiments, each belt is driven by a drive motor that can operate in forward or reverse. As is known in the art such that it does not require further description here, directional control is provided by appropriately setting a forward bit that may be in either an ON or OFF state and a reverse bit that may be in either an ON or OFF state.

At step 640 it is determined if the set speed is greater than zero and the actual speed is less than zero. If this is the case, then the belt direction will be crossing zero from reverse to forward, and the reverse bit is set to OFF and the forward bit is set to ON at step 645. Alternatively, if at step 650 the set speed is determined as less than zero and the actual speed is greater than zero, then the belt direction will be crossing zero from forward to reverse. In this case, the forward bit is set to OFF and the reverse bit is set to ON at step 655.

At step 660 it is determined if the set speed and actual speed are both greater than zero. If this is true, then at step 665 the forward bit is set to ON and the reverse bit is set OFF. At step 670 it is determined if the set speed and actual speed are both less than zero. If this is true, then at step 665 the forward bit is set to OFF and the reverse bit is set ON.

At step 680, a determination is made as to whether the set speed is zero, meaning that the belt should not be moving. If the set speed is zero, then both the forward and reverse bits are set OFF at step 685. In this manner, steps 640 through 685 may be used to provide a directional control signal for the drive motor of a belt.

At step 690, a control signal is sent to the drive motor. The belt speed, which represents the magnitude of the drive signal that is transmitted to the drive motor, is set to the set speed (e.g., target, desired, etc.). Also, the directional control signals, determined from steps 640 through 685, are also sent to the drive motor. Once the signal is sent, the process begins again at step 605. In this manner, the drive motor for a particular belt is provided with a speed and directional control signal once every ten milliseconds.

Figure 7:
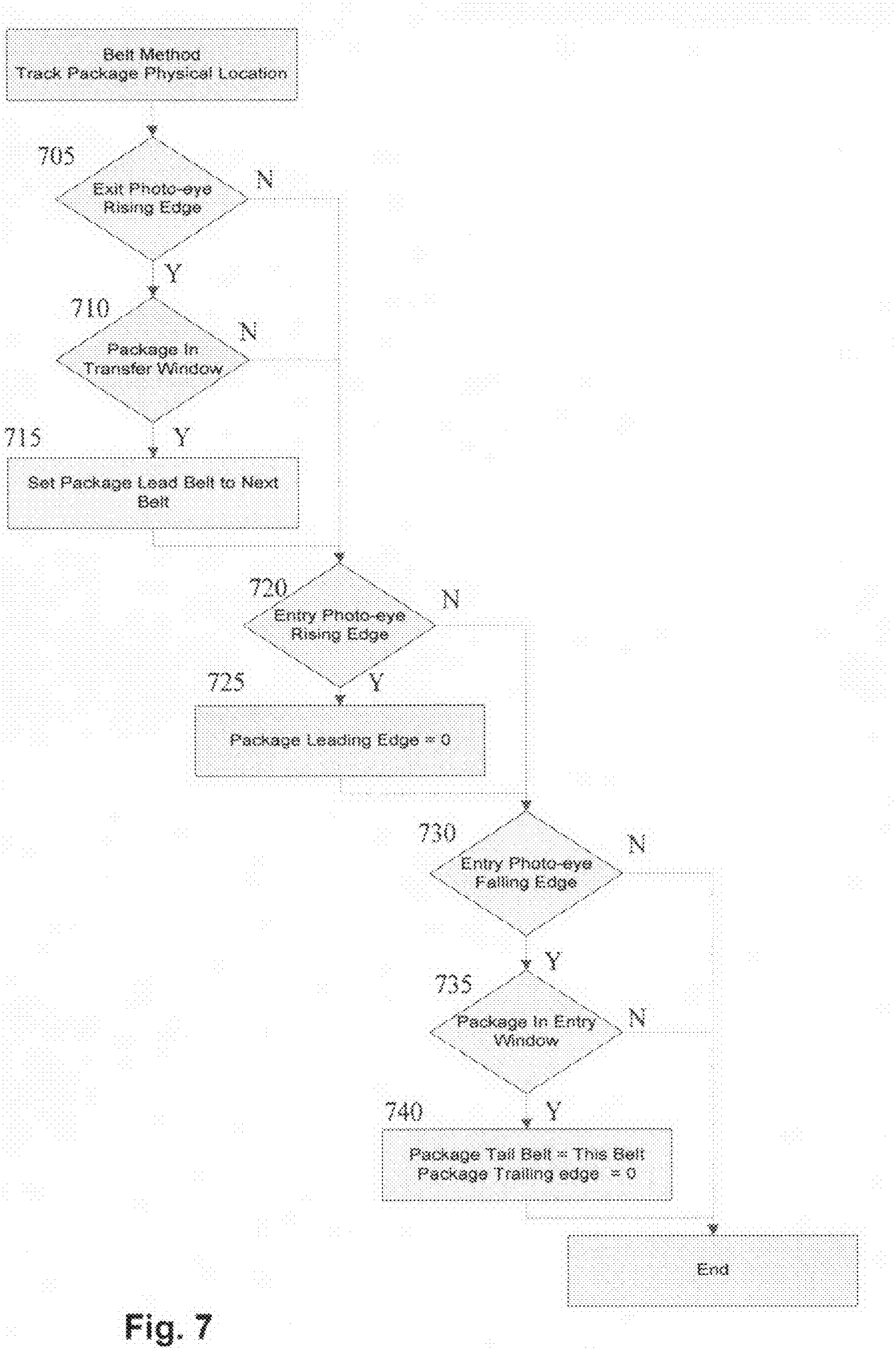

FIG. 7 shows a process for tracking a product physical location on a particular belt of the transfer lane according to aspects of the invention. In embodiments, each belt in the transfer lane has a photoeye at its beginning portion (e.g., entry photoeye) and its end portion (exit photoeye). As described herein, these photoeyes are useful for tracking the physical location of product within the transfer lane, since the predicted position of any particular product may be periodically compared against the physical position of the product as reported by the photoeyes.

At step 705, it is determined if the exit photoeye of the belt is seeing (e.g., being blocked by) the leading (e.g., rising) edge of a product. If this condition is false, then the process proceeds to step 720, described below. However, if step 705 is true, then at step 710 it is determined if the product is in the transfer window. In embodiments, the transfer window is the area at the end of one belt where the product is capable of being physically moved from one belt to the next. The determination at step 710 is whether the predicted position of the product is within this transfer window. If this is the case, then the product leading edge is set to the next belt at step 715. The association of product leading edge and product trailing edge with a particular belt is described in greater detail below.

At step 720, it is determined whether the entry photoeye of the belt is seeing the leading edge of a product. If this is true, then at step 725 the product leading edge is set to position “0” on the current belt. This product leading edge position is used in later logical determinations of predicted position of the product. By setting the product leading edge to “0” at the beginning of each belt, slight shifts in actual position of the product are accommodated, thereby making the predicted position more accurate.

At step 730, it is determined if the entry photoeye is seeing the falling edge of a product. If this is true, then a determination is made whether the product is in the entry window for the belt at step 735. The determination at step 735 is made by examining the logical predicted position of the product to see if the predicted position is located within a predefined area of the belt. If the product is within the entry window, the process proceeds to step 740, in which the product tail belt is set to the current belt and the package trailing edge is set to position “0”.

Figure 8:
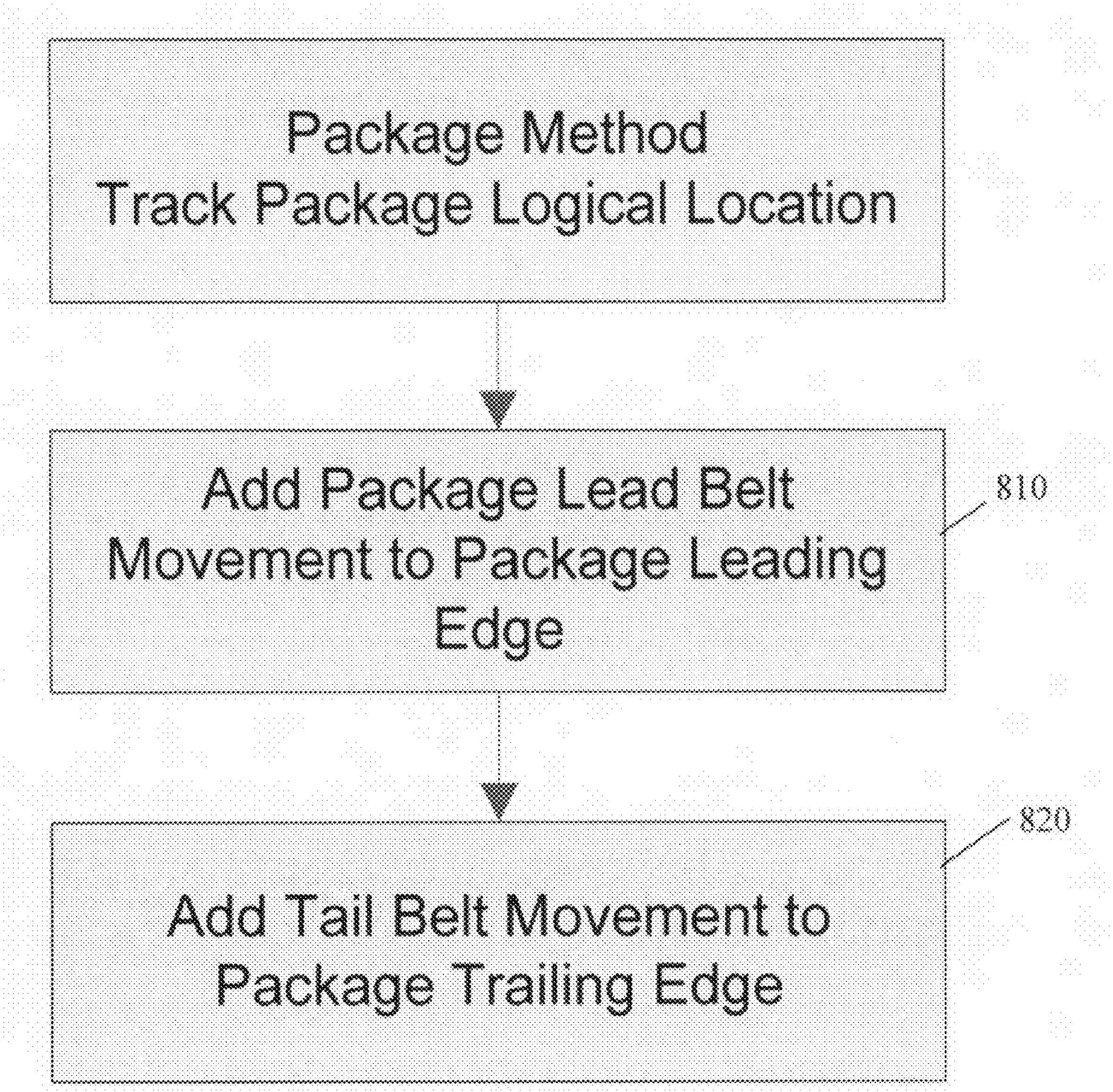

FIG. 8 shows a process for tracking and updating a product logical (e.g., predicted) position on a particular belt of the transfer lane according to aspects of the invention. As described herein, the transfer unit controller tracks the logical position of each product in the transfer lane. In embodiments, the leading edge of each product is associated with a first belt and the trailing edge of the product is associated with a second belt. The first belt and the second belt may be the same belt, or they may be two adjacent belts. For example, if the product is wholly supported by a single belt (e.g., Belt #1), then the product leading edge is associated with Belt #1 and the product trailing edge is associated with Belt #1. However, if the product is physically located such that is spans the gap between Belt #1 and Belt #2, then the product leading edge is associated with Belt #2 while the product trailing edge is associated with Belt #1.

In embodiments, by maintaining and updating the associations of product leading edge and product trailing edge with respective belts, and by tracking the amount of movement of each respective belt, the logical predicted position of the product may be maintained and updated. For example, at step 810, the amount of movement of the belt associated with the product leading edge is added to the product leading edge position. For example, if during a first iteration a product leading edge is on Belt #2 at position “0”, and Belt #2 moves seven inches between the first iteration and the second iteration, then at the second iteration the product leading edge would be at position “7” of Belt #2.

Similarly, at step 820, the amount of movement of the belt associated with the product trailing edge is added to the product trailing edge position. The amount of movement of any belt in the transfer lane is determined by encoder signals received by the transfer unit controller. In this manner, the logical (e.g., predicted) position of each product in the transfer lane may be periodically updated based upon movement of the belts within the transfer lane.

Figure 9:
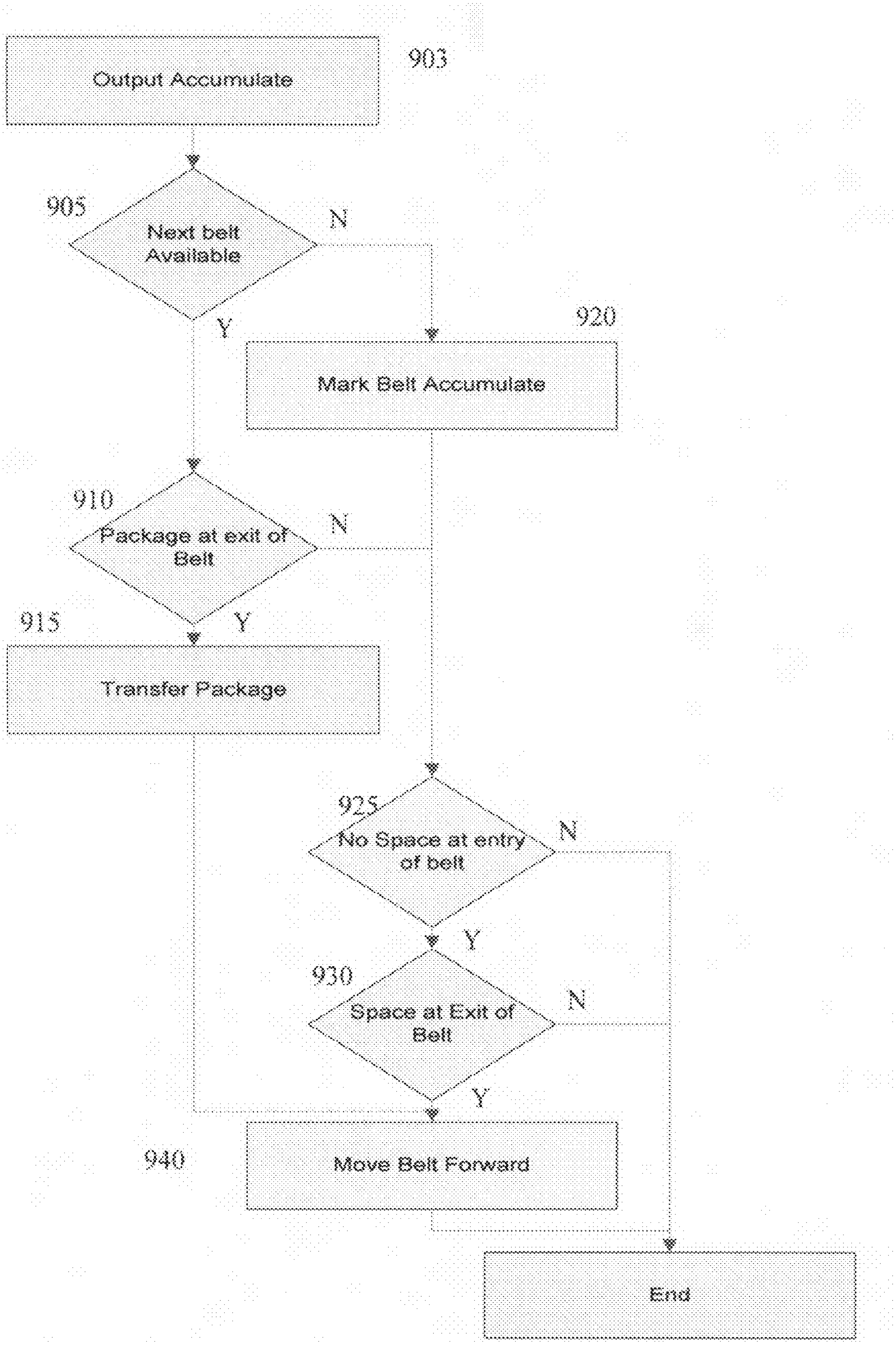

FIG. 9 shows a process for controlling a belt according to aspects of the invention. As described herein, the transfer unit controller controls each belt in the transfer lane in either throughput mode or accumulation (e.g., buffering) mode. In throughput mode, there are no perceived spacing problems downstream of the current belt, such that the belt is controlled to move products through the transfer lane as fast a’s possible. However, accumulation mode represents a paradigm shift from throughput mode in that accumulation mode strives to slow down the movement of product due to perceived spacing problems (e.g., not enough space downstream to receive oncoming products). As such, in embodiments, a belt operating in accumulation mode may only be moved if there is an absolute need to move a product on to or off of that belt.

Referring to FIG. 9, step 903 marks the beginning of a process for controlling a belt of the transfer lane. From step 903 the process proceeds to step 905, where it is determined if the next belt (i.e., the belt immediately downstream of the current belt) is available (e.g., can accept a product). If this is true, then at step 910, a determination is made whether there is a product at the end of the current belt. If both 905 and 910 are true, then at step 915 the product is moved from the current belt to the next belt, and the process proceeds to step 940 where the current belt is moved forward. The determinations and control may be performed by the transfer unit controller, as described herein.

If at step 905 the next belt is not available, then the current belt is marked (e.g., designated) as being in accumulation mode at step 920. From step 920, and alternatively from step 910 if there is not a product at the end of the current belt, the process proceeds to step 925. At step 925, the transfer unit controller determines if there is no available space at the entry (e.g., upstream side) of the current belt. If there is no available space at the entry of the current belt, the transfer unit controller determines at step 930 if there is available space at the exit (e.g., downstream end) of the current belt. If both 925 and 930 are true, then the current belt is moved forward at step 940. However, if there is space at the entry and/or there is not space at the exit of the current belt, then the current belt is restricted from moving, and the process iteration ends.

Figure 10:
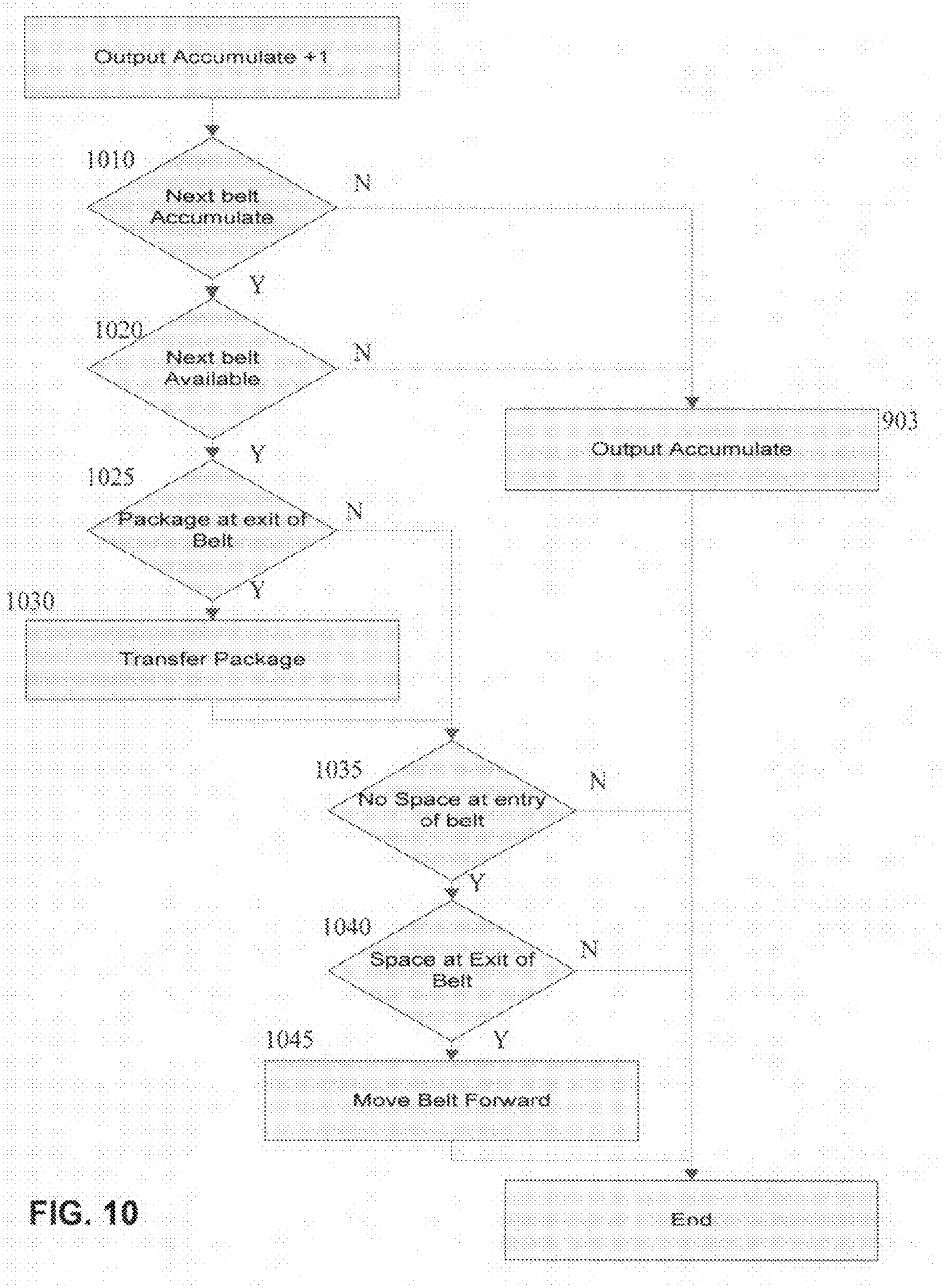

FIG. 10 shows another process for controlling a belt according to aspects of the invention in which the throughput/accumulation mode of the next belt is taken into account for determining the control mode for the current belt. At step 1010, it is determined if the next belt (i.e., the belt immediately downstream of the current belt) is in accumulation mode. If the next belt is in accumulation mode, then at step 1020 it is determined whether the next belt is available. If the next belt is not in accumulation mode at step 1010, or if the next belt is not available at step 1020, then the current belt proceeds to step 903 of FIG. 9.

However, if the next belt is in accumulation mode at step 1010 and the next belt is available at step 1020, then at step 1025 it is determined if there is a product at the exit of the current belt. If there is a product at the exit of the current belt, then at step 1030 the product is transferred to the next belt.

At step 1035, the transfer unit controller determines if there is no available space at the entry (e.g., upstream side) of the current belt. If there is no available space at the entry of the current belt, the transfer unit controller determines at step 1040 if there is available space at the exit (e.g., downstream end) of the current belt. If both 1035 and 1040 are true, then the current belt is moved forward at step 1045. However, if there is space at the entry and/or no space at the exit of the current belt, then the current belt is restricted from moving, and the process iteration ends.

Figure 11:
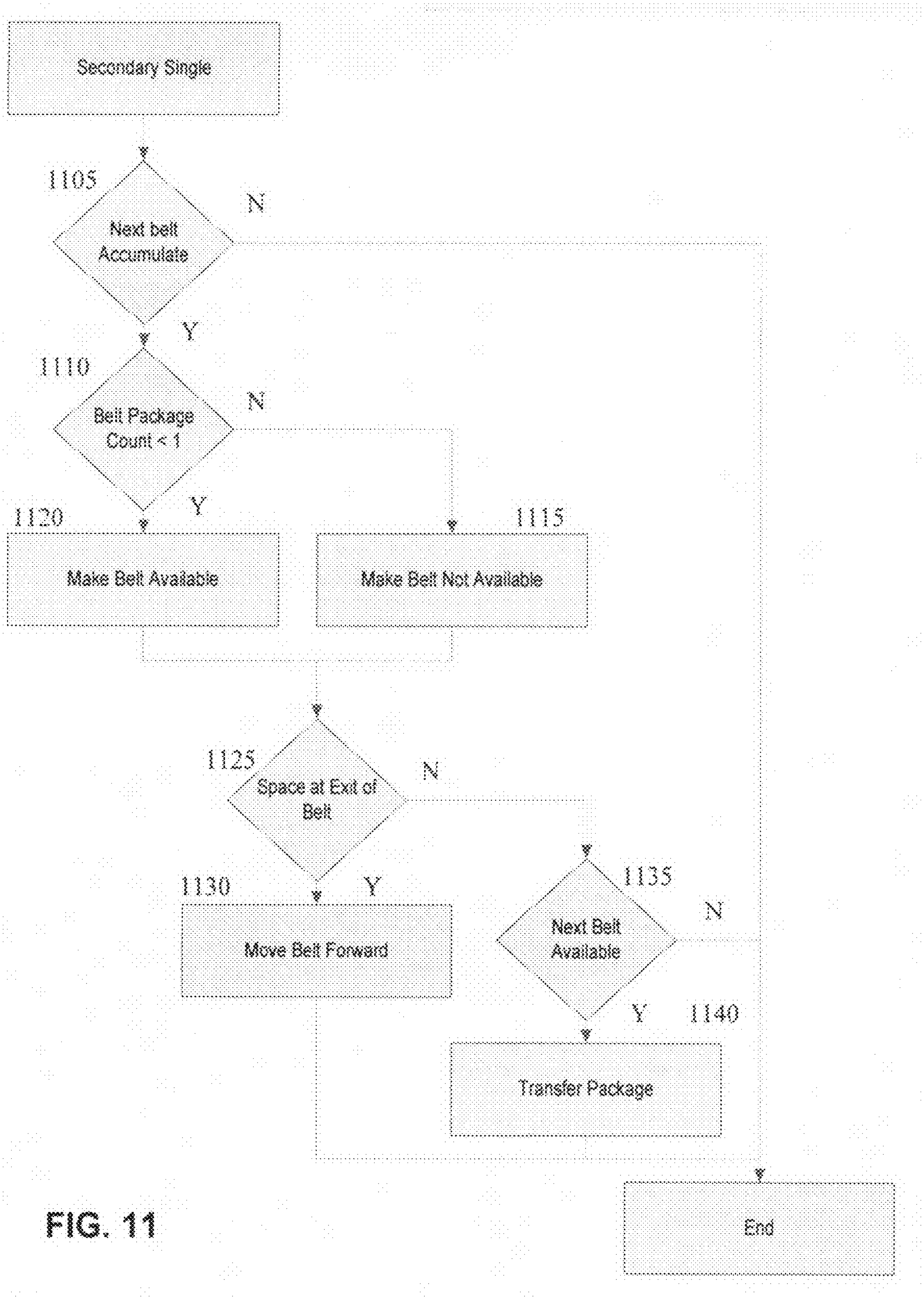

FIG. 11 shows a further process for controlling a belt according to aspects of the invention in which the throughput/accumulation mode of the next belt is taken into account for determining the control mode for the current belt. The process in FIG. 11 limits the amount of product on the current belt if the next belt is in accumulation mode. At step 1105, it is determined whether the next belt is in accumulation mode. If the next belt is not in accumulation mode, then this process ends.

However, if the next belt is in accumulation mode, then at step 1110 a determination is made whether the number of products on the current belt is less than one. If the number of packages on the current belt is not less than one, then at step 1115 the current belt is marked as not available; however, if the number of packages on the current belt is less than one, then at step 1120, the current belt is marked as available.

At step 1125 it is determined if there is space at the exit of the current belt. If there is space, then at step 1130 the current belt is moved forward. However, if there is not space at the exit of the current belt, then at step 1135 it is determined if the next belt is available. If the next belt is not available, then the process ends without moving the current belt. However, if the next belt is available, then at step 1140 the product is transferred to the next belt.

In this manner, the process of FIG. 11 improves the accumulation factor of the system by accumulating packages closer to the downstream end of the transfer lane rather than closer to the upstream end of the transfer lane. Put another way, the process described herein provides a back-to-front (i.e., downstream-to-upstream) accumulation of product within the transfer lane, thereby minimizing wasted space within the transfer lane. For example, experimental simulations using the processes described herein have yielded accumulation rates of up to 95%.

Figure 12:
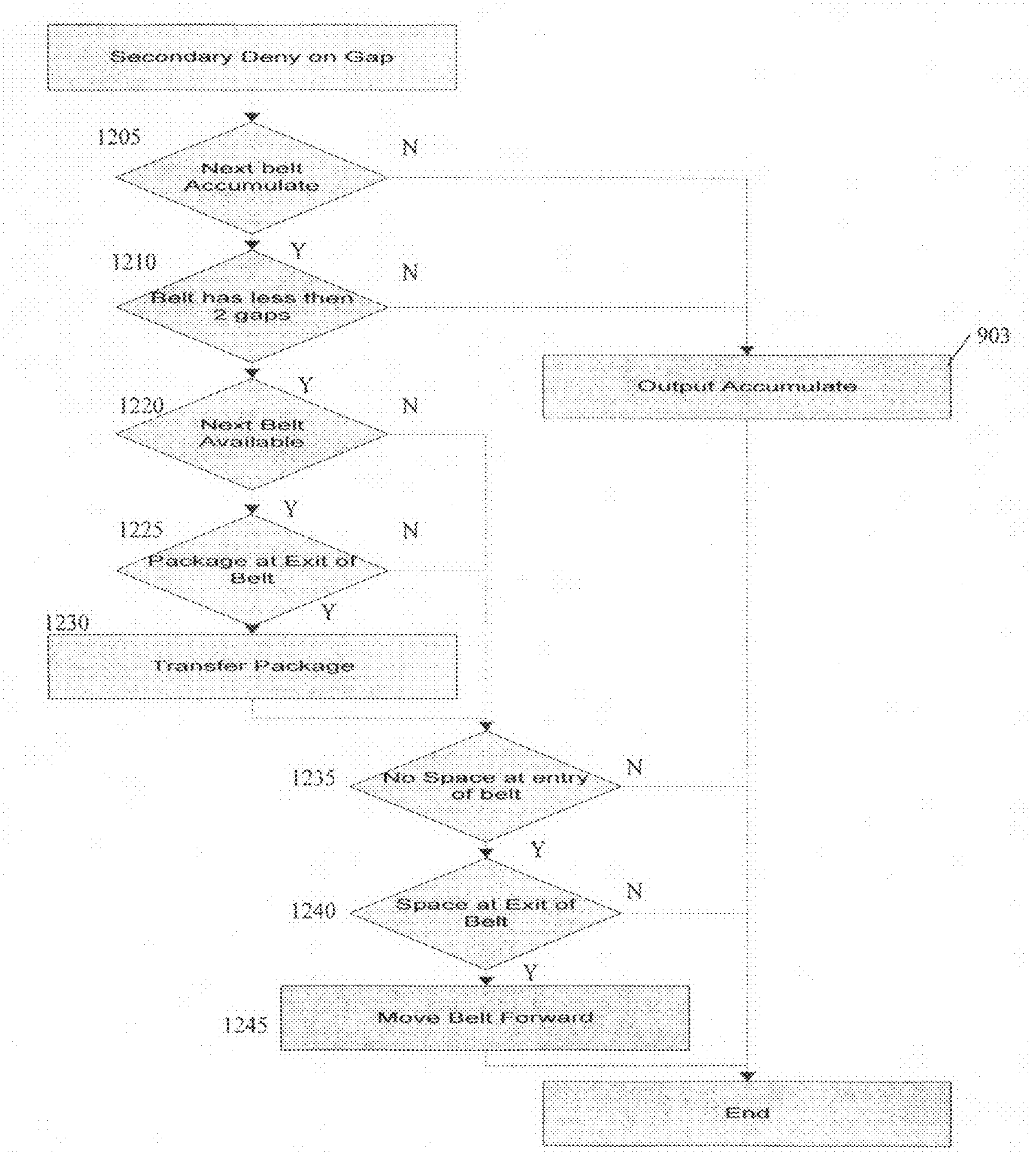

FIG. 12 shows an even further process for controlling a belt according to aspects of the invention in which the throughput/accumulation mode of the next belt is taken into account for determining the throughput/accumulation mode for the current belt. The process in FIG. 12 operates to minimize the gaps between products on accumulating belts, thereby enhancing the efficiency of the accumulation of products.

At step 1205, it is determined whether the next belt is in accumulation mode. If the next belt is in accumulation mode, then at step 1210 it is determined whether the current belt has less than two gaps (e.g., open spaces between products). If the next belt is in accumulation mode and there are less than two gaps on the current belt, then the process proceeds to steps 1220 through 1245, which are performed in the same manner as steps 1020 through 1045 described above with respect to FIG. 10.

However, if the next belt is in not accumulation mode at step 1205 or there are not less than two gaps on the current belt at step 1210, then the process proceeds to step 1215, which reverts to step 903 described above with respect to FIG. 9.

In embodiments, the processes depicted in FIGS. 6-11 are performed by the transfer unit controller and based upon data collected by the transfer unit controller. Moreover, the processes may be performed for each component of the intelligent conveyor system at any desired frequency. For example, the steps of FIGS. 6 and 7 may be performed for each belt in the transfer lane once every ten milliseconds. Similarly, the steps of FIG. 8 may be performed for each product in the transfer lane at the same frequency. Likewise, the steps of one of FIGS. 9-12 may be performed for each belt at the same frequency. In this manner, the transfer unit controller repeatedly updates the state of each component (e.g., belt, product, etc.) in the transfer lane.

Computer Implementation

As described above, aspects of the invention may be embodied in a computer program product, such as, for example, a software program. As used herein, the term "control program" refers to a software program that a transfer unit controller employs to control and track the movement of product through a transfer lane, such as, for example, in the systems and methods described above. In embodiments, the control program has an object-oriented architecture that provides flexibility and modularity. By utilizing object-oriented programming, the physical layout and computer control of a transfer lane may be easily changed to meet an end user's needs.

In embodiments, classes are utilized to provide modularity to, and define aspects of, the control program. The various classes are instantiated into objects at runtime of the control program, where each instantiated object has associated attributes that are defined in a configuration database. The attributes that are defined in the configuration database pertain to aspects of the transfer lane, such as, for example:

- the length of a given conveyor belt or portion (hereinafter referred to a belt or conveyor belt);
- the spatial location of a conveyor belt;
- sensor locations;
- operational parameters for each drive motor; and
- processes for determining drive motor control, etc.

Figure 13:
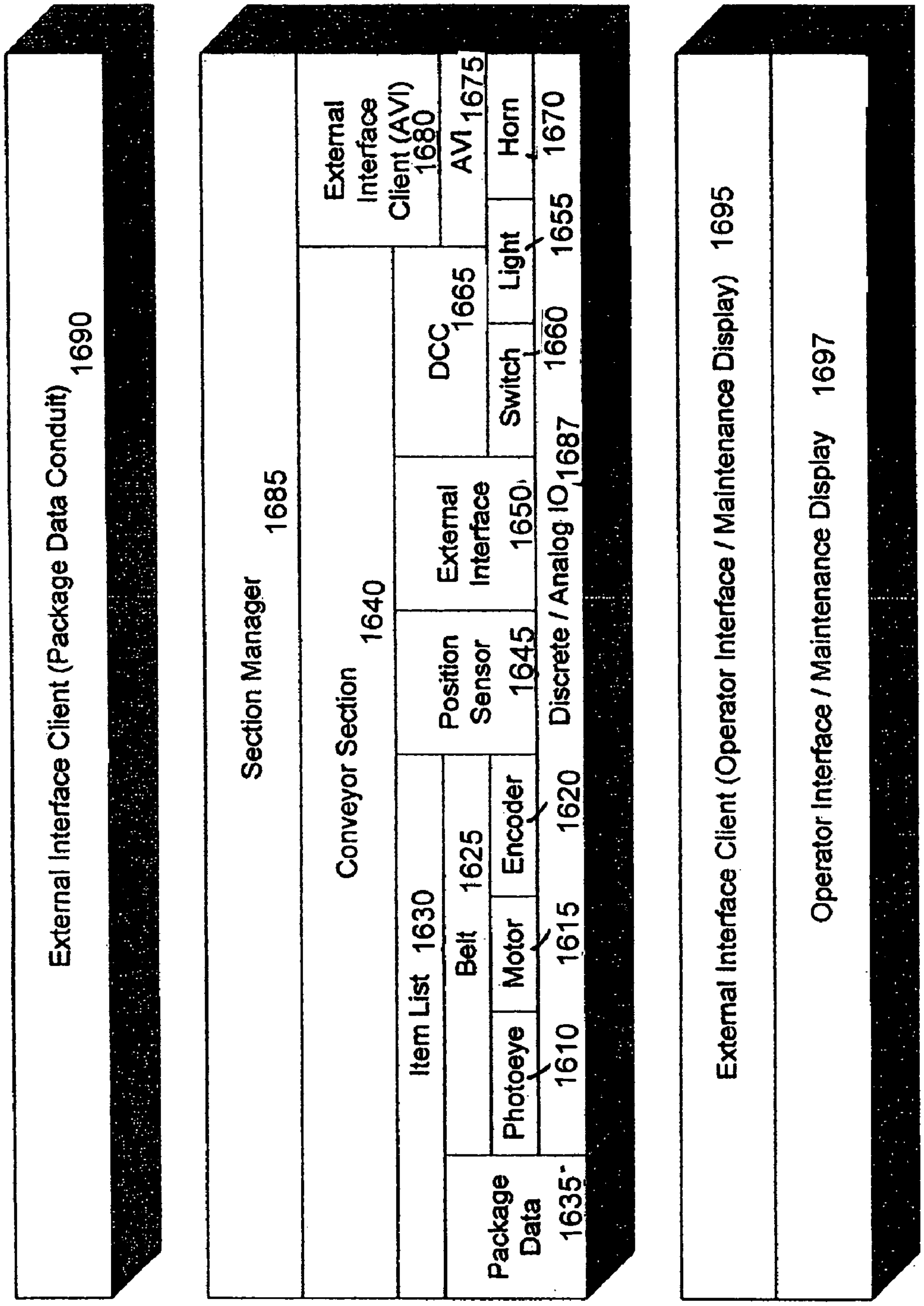
FIG. 13 shows classes of an object oriented program according to aspects of the invention.

FIG. 13 depicts an architectural layout of classes that may be used with implementations of the invention. It is noted that the layout shown in FIG. 13 is merely exemplary, and other layouts may be used with the invention. For example, the layout of FIG. 13 is directed to a transfer lane having conveyor belts; however, the layout of FIG. 13, for example, can be configured for other conveying systems such as, for example, driven rollers. As described above, each conveyor belt in the transfer lane may comprise a photoeye sensor for detecting actual position of product on the conveying system, a drive motor for moving the conveying system, and a rotary shaft encoder for tracking how far the conveyor belt has moved. As such, the base classes Photoeye 1610, Motor 1615, and Encoder 1620 are contained within container class Belt 1625.

The base classes Photoeye 1610, Motor 1615, and Encoder 1620 define the general characteristics of how the control program receives data from, processes data regarding, and/or sends data to these components. For example, the class Encoder 1620 may define the calibration of a rotary shaft encoder (e.g., the number of electrical pulses per length of conveyor belt travel). The class Motor 1615 defines how to control the drive motor speed and direction. The class Photoeye 1610 defines how to processes signals received from the photoeye sensor.

Each belt in the transfer lane is associated with a Belt class 1625 which coordinates the data from each of Photoeye 1610, Motor, 1615, and Encoder 1620. The Belt class 1625 is, in turn, contained within the class Item List 1630. The class Item List 1630 coordinates the data of Belt class 1625 and also of the data associated with each product contained within class Package Data 1635. Item List 1630 is contained within class Conveyor Section 1640, which also contains classes Position Sensor 1645, External Interface 1650, and Distributor Control. Cabinet (DCC) 1655.

Position Sensor 1645 is an optional class associated with a sensor that determines where a product is for induction in the downstream sorting and/or sequencing system. External Interface 1650 is a class associated with an exchange of communication to either the upstream or downstream sorting and/or sequencing system. For example, the transfer lane may inform:

- the upstream sorting and/or sequencing system that a cell is available for deduction;
- the downstream sorting and/or sequencing system that it needs an open cell for induction; or
- the downstream sorting and/or sequencing system that it inducted a product.

Each section of the transfer lane may have a dedicated distributor control cabinet, which, in embodiments, provides an interface for users (e.g., maintenance personnel). The class DCC 1655 is associated with this cabinet, and contains the classes Switch 1660, Light 1665, and Horn 1670. Switch class 1660 may be associated with, for example, at least one switch in the distributor control cabinet for manually turning on and off the belts in the conveyor section. Light class 1665 may be associated with, for example, at least one visual indicator in the distributor control cabinet that indicates functionality of the section, such as, for example, fault indication lights. Horn class 1670 may be associated with, for example, at least one aural indicator in the distributor control cabinet that indicates functionality of the section, such as, for example, fault indication siren.

The classes Light 1665 and Horn 1670 are also contained in class AVI (audio visual interface) 1675, which is contained in class External Interface Client (AVI) 1680. AVI class 1675 may be associated with additional audio and/or visual indicators related to the entire transfer lane. External Interface Client (AVI) class 680 puts all of the audio and/or visual indicators for the transfer lane on a separate bus for a separate computer (e.g., personal computer) for monitoring and/or controlling the audio and/or visual indicators.

Still referring to FIG. 13, the class Section Manager 1685 contains the classes Conveyor Section 1640 and External Interface Client (AVI) 1680, and manages the operation of the entire transfer lane. Also shown in FIG. 13 are the classes: External Interface Client (Package Data Conduit) 1690, External Interface Client (Operator Interface/Maintenance Display) 1695, and Operator Interface/Maintenance Display 1697.

The class External Interface Client (Package. Data Conduit) 1690 defines how data pertaining to product attributes (e.g., size, weight, delivery address, etc.) is passed between the sorting and/or sequencing system and the transfer unit controller. The class Operator Interface/Maintenance Display 1697, which is contained in the class External Interface Client (Operator Interface/Maintenance Display) 1695, coordinates data to be displayed to user (e.g., a maintenance operator), such as, for example, a text-based explanation of why an indicator light or alarm is activated. The External Interface Client (Operator Interface/Maintenance Display) class 1695 defines how the data is presented to the user.

In embodiments, the control program utilizes dynamic allocation of memory to minimize required computing resources, thereby making the control program more computationally efficient. That is, memory is only allocated for instantiated objects, instead of allocating a predetermined amount of memory that could accommodate all possibilities (e.g., a maximum static array). This is accomplished by each container class, upon its own instantiation, finding the configuration for and instantiating all of the sub-classes contained within that container class. This may be thought of as a top-down instantiation, where instantiation starts at the highest level classes and works its way down. For example, referring to FIG. 13, instantiation would begin with the Section Manager 1685, move to the Conveyor Section 1640, then to the Item List 1630, etc.

Figure 14:
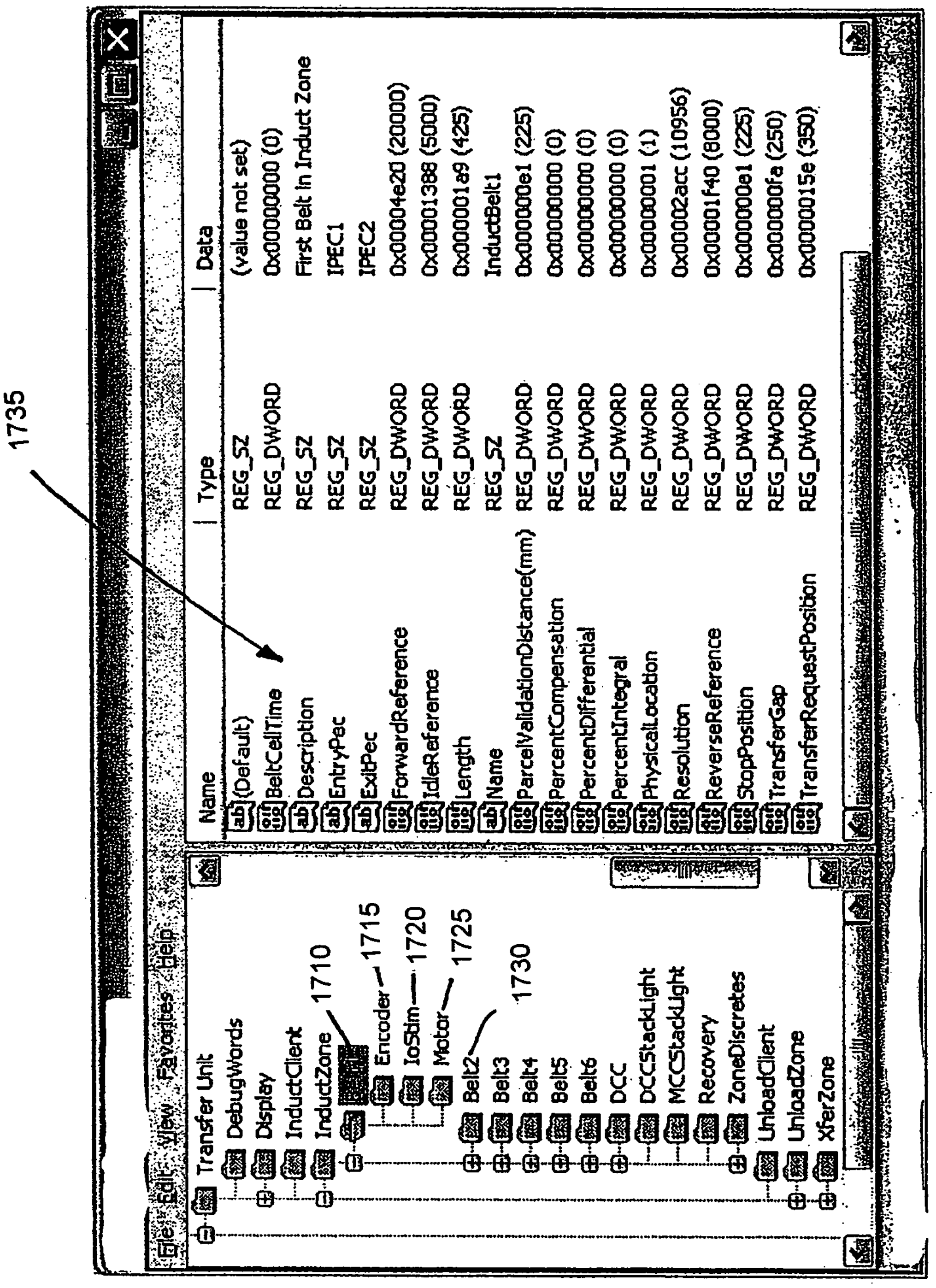
FIG. 14 shows a configuration database according to aspects of the invention.

According to aspects of the invention, a configuration database is utilized to provide data for the above-mentioned instantiation. As alluded to above, all of the unique characteristics for each object are defined within the configuration database. In embodiments, the configuration database has a hierarchical construction, as depicted in FIG. 14, meaning that system components are composed of base level objects. The configuration of these base level objects reside in a hierarchical structure under their associated system component.

Referring to FIG. 14, an exemplary hierarchy of objects (e.g., Belt1 1710, Encoder 1715, IoStim 1720, Motor 725, Belt2 1730, etc.) is shown. The selected object (e.g., Belt 1710) has its attributes 1735 shown on the right. In embodiments, the configuration database may comprise any suitable database, such as, for example, Windows Registry®, Oracle®, etc.

The above-described use of classes and a configuration file provides modularity to the system. That is, a change in the physical configuration of the transfer lane may be reflected in the control program by only changing the appropriate data in the configuration file and/or the appropriate class. For example, if an existing photoeye is exchanged for a new photoeye, then the configuration file would need to be altered to reflect the physical attributes (e.g., location, sensitivity, etc.) of the new photoeye. Additionally, but not necessarily, the class Photoeye 1610 may need to be changed. However, the remainder of the configuration file and the other classes would not require any changes for the control program to operate the transfer lane based upon the new physical configuration. Thus, the control program can be adapted to a change in any aspect of the transfer lane (e.g., belt length, belt location, type of conveyor system (driven rollers vs. belt), motor parameters, photoeye location, etc.) by simply changing the appropriate data in the configuration file and/or class definitions. This provides great modularity and flexibility in installing and/or changing transfer lanes.

Figure 15:
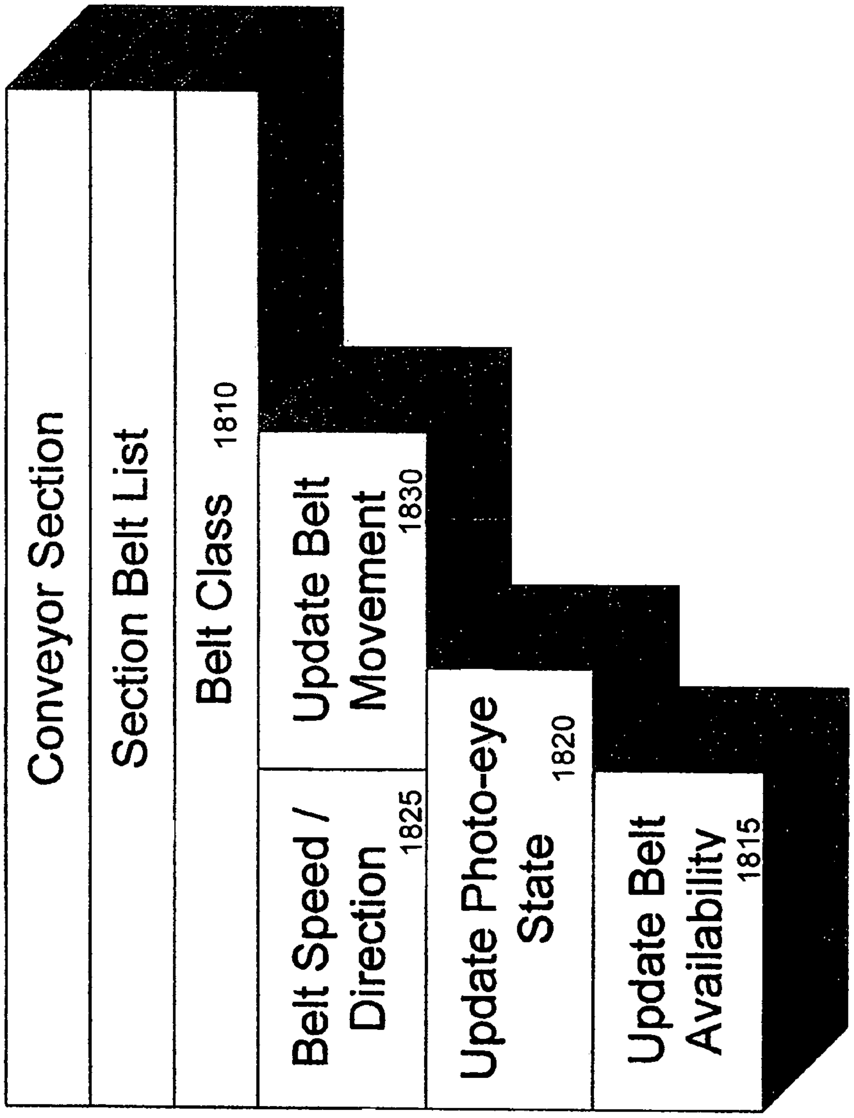
FIG. 15 shows a program layer according to aspects of the invention.

FIG. 15 shows an exemplary depiction of a belt tracking layer that can be used with embodiments of the invention. In embodiments, the control program comprises the belt tracking layer for each conveyor belt in the transfer lane. The belt tracking layer may function to:

maintain belt availability and status;

track belt movement;

maintain and report photoeye status; and control belt speed and direction.

As seen in FIG. 15, the Belt Class 1810 is associated with the class Belt 1625 shown in FIG. 13. The class Update Belt Availability 1815 reports to the Belt class 1810 whether the particular belt is functioning properly (e.g., available) or not functioning properly (e.g., not available). The class Update Photo-eye State 1820 reports whether the photoeye is blocked or not, thereby indicating whether a product is passing through the photoeye sensor. The class Belt Speed/Direction 1825 defines how the control program sends signals to the drive motor to move the belt at a desired speed. The class Update Belt Movement 1830 defines how the control program monitor movement of the belt through the signal from the rotary shaft encoder.

Figure 16:
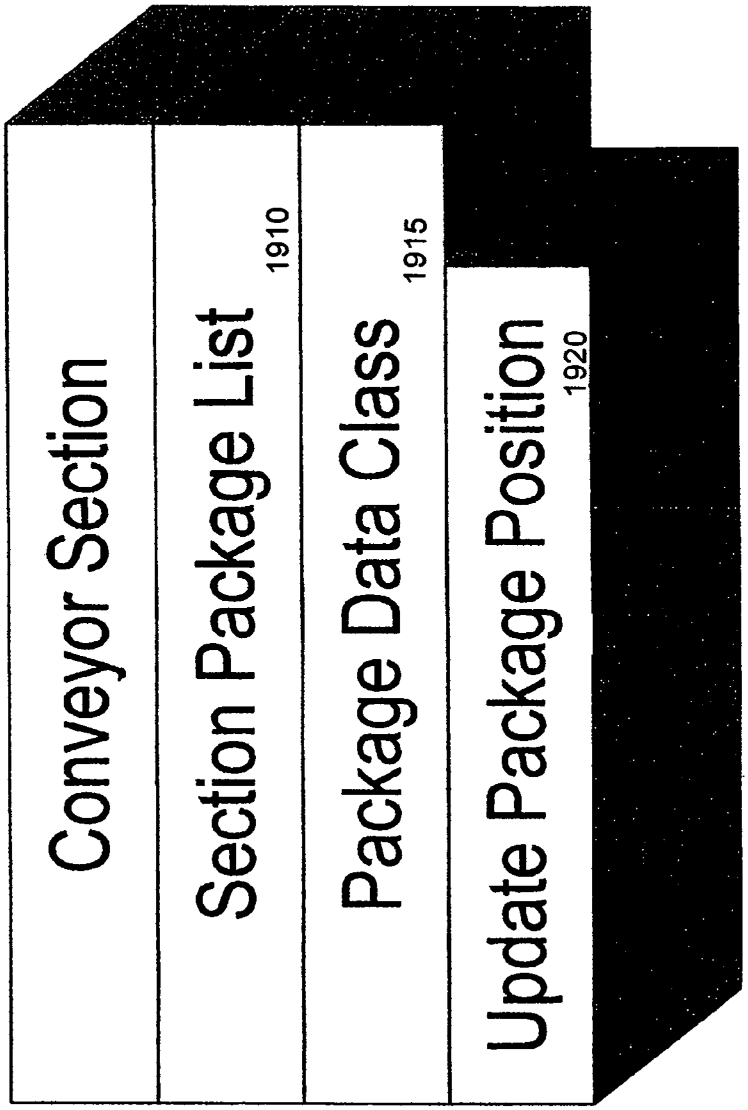
FIG. 16 shows a further program layer according to aspects of the invention.

FIG. 16 shows an exemplary depiction of a package tracking layer that can be used with embodiments of the invention. In embodiments, the control program comprises the package tracking layer that functions to track the product predicted position and maintain the attributes (e.g., size, weight, delivery address, etc.) for each product in the transfer lane. As seen in FIG. 16, the class Section Package List 1910 relates to the class Item List 1630 described in FIG. 13. The class Package Data Class 1915 is associated with maintaining the attributes (e.g., size, weight, delivery address, etc.) of the product. The class Update Package Position 1920 defines the process for determining a predicted position of a product in the transfer lane.

As previously discussed, the transfer unit controller may operate each conveyor belt individually in either a buffering mode or a throughput mode. For example, the transfer unit controller has the ability to dynamically determine whether each conveyer belt of the transfer lane that does not participate in either the deduction or the induction function needs to act as a product buffer or to move the products along as fast as possible. This allows the system to avoid the inability to utilize the available space on a conveyer due to the arrival time of products.

Figure 17:
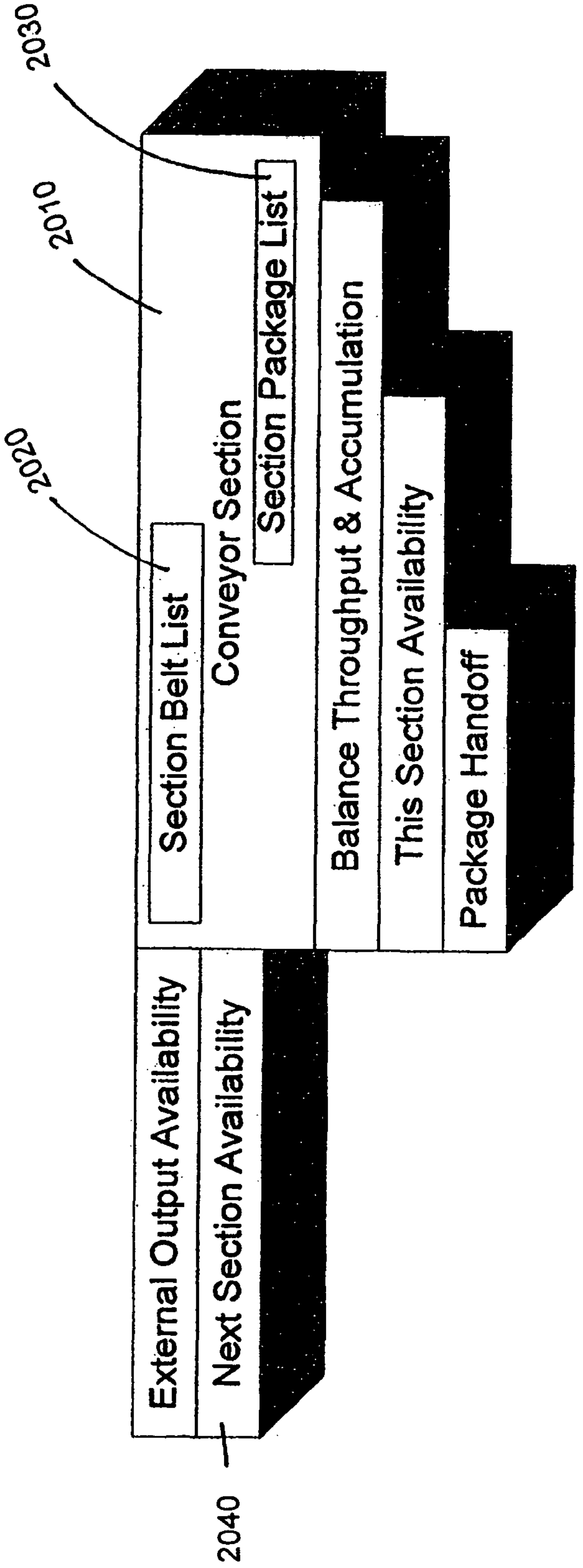
FIG. 17 shows a further program layer according to aspects of the invention.

FIG. 17 shows an exemplary depiction of a dynamic accumulation/throughput tracking layer that can be used with embodiments of the invention. To accomplish this, the control program comprises a dynamic accumulation/throughput tracking layer. This programming layer functions to monitor all of the system components for availability and status, monitor the position of all product, and determine an appropriate balance between product accumulation (e.g., buffering) and throughput. In embodiments, the class Conveyor Section 2010 contains a Belt List 2020 and a Package List 2030 and has the member functions to accumulate or run throughput. It also uses the next belt availability and Next Section Availability 2040 to determine accumulation and throughput processes.

Thus, as described herein, implementations of the inventions are useful in the art of mail sorting and provide many benefits in this area. For example, when a facility is running Incoming/Outgoing sort plans, product may be automatically redirected to a correct sorter without rehandling, i.e., running the product through an input feeder of the sorter. Also, when running the same sort plan, low density destinations can be directed to a single sorting and/or sequencing system. This provides for: combining partial full containers; freeing up bins to facilitate further breakouts of higher volume destinations; and/or using extra bins with current bin chaining rules for high density outputs (thereby improving individual sorter throughput.) Moreover, when running same sort plan, bin sweep rejects can be redirected to the other machine.

The foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A system, comprising:

a first sorting and/or sequencing system including an input feeder arranged to receive a random stream of a plurality of products, and a first endless conveyor arranged to receive the plurality of products from the input feeder and move the plurality of products toward discharge chutes;

a conveying system arranged to deduct a subset of products of the plurality of products from the first endless conveyor, and induct the subset of products onto a second endless conveyor of a second sorting and/or sequencing system; and a conveying controller arranged to:

receive product information associated with each product of the subset of products from the first sorting and/or sequencing system;

transmit the product information to the second sorting and/or sequencing system;

determine position data of the subset of products within the conveying system; and control movement of the subset of products within the conveying system based upon the determined position data.

2. The system of claim 1, wherein the conveying system comprises at least one deduction conveyor, at least one transfer conveyor, and at least one induction conveyor arranged to move the subset of products from the first sorting and/or sequencing system to the second first sorting and/or sequencing system.

3. The system of claim 2, wherein the conveying controller controls speed and direction of the at least one deduction conveyor, the at least one transfer conveyor, and the at least one induction conveyor independently of each other and substantially simultaneously based upon a predicted position of each product of the subset of products.

4. The system of claim 2, wherein the conveying controller controls speed and direction of the at least one deduction conveyor, the at least one transfer conveyor, and the at least one induction conveyor independently of each other and substantially simultaneously in either a buffering mode or a throughput mode.

5. The system of claim 2, wherein:

the conveying controller controls a speed and direction of the at least one deduction conveyor based upon an operational mode of the at least one transfer conveyor, and the conveying controller controls a speed and direction of the at least one transfer conveyor based upon an other operational mode of the at least one induction conveyor.

6. The system of claim 2, wherein the at least one deduction conveyor, the at least one transfer conveyor, and the at least one induction conveyor comprise conveyor belts.

7. The system of claim 2, wherein:

the at least one deduction conveyor is at a first end of the at least one transfer conveyor; and the at least one induction conveyor is at a second end of the at least one transfer conveyor opposite the first end.

8. The system of claim 1, wherein the determined position data includes a predicted position of each product of the subset of products.

9. The system of claim 1, wherein the conveying controller is further arranged to:

determine speed and direction data of a plurality of conveyors in the conveying system, and control movement of the subset of products within the conveying system based upon the determined position data and the speed and direction data.

10. The system of claim 1, further comprising a second conveying system arranged to deduct a second subset of products of the plurality of products from the first endless conveyor, and induct the second subset of products onto a third endless conveyor of a third sorting and/or sequencing system.

11. The system of claim 10, wherein:

the conveying system comprises at least one deduction conveyor, at least one transfer conveyor, and at least one induction conveyor arranged to move the subset of products from the first sorting and/or sequencing system to the second sorting and/or sequencing system;

the second conveying system comprises at least one second deduction conveyor, at least one second transfer conveyor, and at least one second induction conveyor arranged to move the second subset of products from the first sorting and/or sequencing system to the third sorting and/or sequencing system; and the at least one second deduction conveyor, the at least one second transfer conveyor, and the at least one second induction conveyor are separate from the at least one deduction conveyor, the at least one transfer conveyor, and the at least one second induction conveyor, respectively.

12. The system of claim 1, further comprising:

a second input feeder arranged to receive a second random stream of a second plurality of products and deposit the second plurality of products onto the second endless conveyor; and a second conveying system arranged to deduct a second subset of products of the second plurality of products from the second endless conveyor, and induct the second subset of products onto the first endless conveyor.

13. The system of claim 12, wherein the random stream of product and the second random stream of product originate from a single stream of random mail pieces.

14. The system of claim 12, wherein:

the conveying system comprises at least one deduction conveyor, at least one transfer conveyor, and at least one induction conveyor arranged to move the subset of products from the first sorting and/or sequencing system to the second sorting and/or sequencing system;

the second conveying system comprises at least one second deduction conveyor, at least one second transfer conveyor, and at least one second induction conveyor arranged to move the second subset of products from the second sorting and/or sequencing system to the first sorting and/or sequencing system; and the at least one second deduction conveyor, the at least one second transfer conveyor, and the at least one second induction conveyor are separate from the at least one deduction conveyor, the at least one transfer conveyor, and the at least one second induction conveyor, respectively.

15. The system of claim 1, wherein:

the first sorting and/or sequencing system comprises a first controller arranged to sort and/or sequence a remainder of the plurality of products into the discharge chutes, and the second sorting and/or sequencing system comprises a second controller arranged to sort and/or sequence the subset of products into second discharge chutes.

16. The system of claim 15, wherein:

the first controller receives the product information from the input feeder and passes the product information to the conveying controller, and the second controller receives the product information from the conveying controller.

17. The system of claim 16, wherein the plurality of products comprises mail pieces and the product information comprises delivery address information.

18. The system of claim 1, wherein the conveying system deducts only the subset of the plurality of products from the first endless conveyor.

19. The system of claim 1, wherein:

the conveying system comprises a deduction section, a transfer section, and an induction section; and the conveyor controller is configured to drive a conveyor belt of the deduction section at substantially a same speed as a cross-belt sorter that moves a respective one of the subset of products off of the first endless conveyor.

20. The system of claim 19, wherein the conveyor controller is configured to drive a conveyor belt of the induction section at substantially a same speed as the second endless conveyor.

21. The system of claim 1, wherein the product information includes at least one of: weight, dimensions, and address.

22. The system of claim 1, wherein a controller of the first sorting and/or sequencing system determines whether it is possible to deduct a respective one of the subset of products to the conveying system.

23. The system of claim 1, wherein at least one conveyor belt of the conveying system is configured to move forward at times and in reverse at other times based at least partly on the determined position data of the subset of products within the conveying system.

24. The system of claim 1, wherein the subset of products is sorted in the second sorting and/or sequencing system without passing the subset of products through another input feeder.

25. A method, comprising:

deducting selected ones of a plurality of products from a first sorting and/or sequencing system to a conveying system;

determining data including at least one of: a predicted position of each of the selected ones of the plurality of products within the conveying system, and speed and direction of conveyors of the conveying system;

controlling movement of the selected ones of the plurality of products through the conveying system by controlling speed and direction of the conveyors based upon the determined data;

inducting the selected ones of the plurality of products onto a second sorting and/or sequencing system;

gathering product information of the plurality of products with an input feeding device of the first sorting and/or sequencing system; and passing the gathered product information of the selected ones of a plurality of products from the conveying system to the second sorting and/or sequencing system.

26. The method of claim 25, further comprising:

passing the gathered product information of the selected ones of a plurality of products from the first sorting and/or sequencing system to the conveying system.

27. The method of claim 26, further comprising sorting and/or sequencing the selected ones of a plurality of products in the second sorting and/or sequencing system using the gathered product information of the selected ones of a plurality of products.

28. The method of claim 26, wherein the plurality of products comprises mail pieces and the product information comprises delivery information.

29. The method of claim 25, wherein the controlling speed and direction of the conveyors comprises controlling the conveyors independently of each other and substantially simultaneously in either a buffering mode or a throughput mode.

30. The method of claim 25, wherein the conveying system deducts only the selected ones of the plurality of products from the first sorting and/or sequencing system.

31. The method of claim 25, wherein:

the deducting comprises moving the selected ones of the plurality of products onto at least one deduction conveyor at a first end of at least one transfer conveyor of the conveying system; and the inducting comprises moving the selected ones of the plurality of products off of at least one induction conveyor at a second end of the at least one transfer conveyor opposite the first end.

32. The method of claim 25, wherein the conveying system comprises a deduction section, a transfer section, and an induction section, and further comprising driving a conveyor belt of the deduction section at substantially a same speed as a cross-belt sorter that moves a respective one of the selected ones of the plurality of products off of the first sorting and/or sequencing system.

33. The method of claim 32, further comprising driving a conveyor belt of the induction section at substantially a same speed as an endless conveyor of the second sorting and/or sequencing system.

34. The method of claim 25, further comprising using detectors at opposite ends of respective ones of a plurality of conveyor belts in the conveying system to determine the predicted position of each of the selected ones of the plurality of products within the conveying system.

35. The method of claim 25, further comprising determining whether it is possible to deduct a respective one of the subset of products to the conveying system.

36. The method of claim 25, further comprising driving at least one conveyor belt of the conveying system forward at times and in reverse at other times based at least partly on the predicted position of each of the selected ones of the plurality of products within the conveying system.

37. The method of claim 25, further comprising sorting or sequencing the selected ones of the plurality of products in the second sorting and/or sequencing system without passing the selected ones of the plurality of products through an input feeder at the second sorting and/or sequencing system.

* * * * *